(12) United States Patent
Minnette et al.

(10) Patent No.: US 10,046,880 B2
(45) Date of Patent: *Aug. 14, 2018

(54) CONTAINER

(71) Applicant: Berry Plastics Corporation, Evansville, IN (US)

(72) Inventors: Jeffrey C. Minnette, Evansville, IN (US); Philip A. Driskill, Newburgh, IN (US); David D. Sun, Evansville, IN (US); Rolland Strasser, Asbury, NJ (US); Birju A. Surti, Ronks, PA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,115

(22) Filed: Dec. 19, 2016

(65) Prior Publication Data

US 2017/0101208 A1  Apr. 13, 2017

Related U.S. Application Data

(63) Continuation of application No. 14/787,901, filed as application No. PCT/US2014/027551 on Mar. 14, 2014, now Pat. No. 9,725,202.

(60) Provisional application No. 61/783,994, filed on Mar. 14, 2013.

(51) Int. Cl.
| | |
|---|---|
| *B65D 1/02* | (2006.01) |
| *B32B 27/06* | (2006.01) |
| *B32B 27/32* | (2006.01) |
| *B32B 1/02* | (2006.01) |

(52) U.S. Cl.
CPC .............. *B65D 1/0215* (2013.01); *B32B 1/02* (2013.01); *B32B 27/065* (2013.01); *B32B 27/32* (2013.01); *B32B 2266/025* (2013.01); *B32B 2307/304* (2013.01); *B32B 2307/72* (2013.01); *B32B 2439/00* (2013.01)

(58) Field of Classification Search
CPC ......... B32B 27/065; B32B 27/32; B32B 1/02; B32B 2266/025; B32B 2307/304; B32B 2307/72; B32B 2439/00; B65D 1/0215
See application file for complete search history.

(56) References Cited

U.S. PATENT DOCUMENTS

| | | |
|---|---|---|
| 1,396,282 A | 11/1921 | Penn |
| 1,435,120 A | 11/1922 | Holman |
| 1,920,529 A | 8/1933 | Sidebotham |
| 1,969,030 A | 8/1934 | Page |

(Continued)

FOREIGN PATENT DOCUMENTS

| | | |
|---|---|---|
| BE | 898053 | 4/1984 |
| CA | 2291607 | 6/2000 |

(Continued)

OTHER PUBLICATIONS

Chinese Office Action dated Aug. 3, 2016 for Chinese Patent Application 201480007369.3, 13 pages.

(Continued)

*Primary Examiner* — Michael G Miggins
(74) *Attorney, Agent, or Firm* — Barnes & Thornburg LLP

(57) ABSTRACT

A vessel is configured to hold a product in an interior region formed in the vessel. In illustrative embodiments, the vessel includes a floor and a sidewall coupled to the floor to extend away from the floor. Together the floor and sidewall cooperate to define the interior region.

21 Claims, 17 Drawing Sheets

(56) References Cited

U.S. PATENT DOCUMENTS

| | | |
|---|---|---|
| 2,097,899 A | 12/1935 | Smith |
| 2,103,831 A | 12/1937 | Sidon |
| 2,809,776 A | 3/1956 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Harold |
| 3,443,715 A | 5/1969 | Edwards Bryant |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,036,675 A | 7/1977 | Amberg |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,264,672 A | 4/1981 | Taylor-Brown |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,929,127 A | 7/1999 | Raetzsch |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | DeNicola |
| 6,225,366 B1 | 5/2001 | Raetzsch |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |

(56) References Cited

U.S. PATENT DOCUMENTS

| | | | |
|---|---|---|---|
| 6,720,362 | B1 | 4/2004 | Park |
| 6,749,913 | B2 | 6/2004 | Watanabe |
| 6,779,662 | B2 | 8/2004 | Dorsey |
| 6,811,843 | B2 | 11/2004 | DeBraal |
| 6,814,253 | B2 | 11/2004 | Wong |
| 6,875,826 | B1 | 4/2005 | Huovinen |
| 6,883,677 | B2 | 4/2005 | Goeking |
| 6,884,377 | B1 | 4/2005 | Burnham |
| 6,884,851 | B2 | 4/2005 | Gauthy |
| 6,908,651 | B2 | 6/2005 | Watanabe |
| 6,926,507 | B2 | 8/2005 | Cardona |
| 6,926,512 | B2 | 8/2005 | Wu |
| 6,982,107 | B1 | 1/2006 | Hennen |
| 7,056,563 | B2 | 6/2006 | Halabisky |
| 7,070,852 | B1 | 7/2006 | Reiners |
| 7,074,466 | B2 | 7/2006 | DeBraal |
| 7,094,463 | B2 | 8/2006 | Haas |
| 7,121,991 | B2 | 10/2006 | Mannlein |
| 7,144,532 | B2 | 12/2006 | Kim |
| 7,173,069 | B2 | 2/2007 | Swennen |
| 7,234,629 | B2 | 6/2007 | Herbert |
| 7,281,650 | B1 | 10/2007 | Milan |
| 7,355,089 | B2 | 4/2008 | Chang |
| 7,361,720 | B2 | 4/2008 | Pierini |
| 7,365,136 | B2 | 4/2008 | Huovinen |
| 7,423,071 | B2 | 9/2008 | Mogami |
| 7,458,504 | B2 | 12/2008 | Robertson |
| 7,504,347 | B2 | 3/2009 | Poon |
| 7,510,098 | B2 | 3/2009 | Hartjes |
| 7,513,386 | B2 | 4/2009 | Hartjes |
| 7,514,517 | B2 | 4/2009 | Hoenig |
| 7,524,911 | B2 | 4/2009 | Karjala |
| 7,557,147 | B2 | 7/2009 | Martinez |
| 7,579,408 | B2 | 8/2009 | Walton |
| 7,582,716 | B2 | 9/2009 | Liang |
| 7,585,557 | B2 | 9/2009 | Aylward |
| 7,592,397 | B2 | 9/2009 | Markovich |
| 7,608,668 | B2 | 10/2009 | Shan |
| 7,622,179 | B2 | 11/2009 | Patel |
| 7,622,529 | B2 | 11/2009 | Walton |
| 7,622,881 | B2 | 11/2009 | Golownia et al. |
| 7,629,416 | B2 | 12/2009 | Li |
| 7,655,296 | B2 | 2/2010 | Haas |
| 7,662,881 | B2 | 2/2010 | Walton |
| 7,666,918 | B2 | 2/2010 | Prieto |
| 7,671,106 | B2 | 3/2010 | Markovich |
| 7,671,131 | B2 | 3/2010 | Hughes |
| 7,673,564 | B2 | 3/2010 | Wolf |
| 7,687,442 | B2 | 3/2010 | Walton |
| 7,695,812 | B2 | 4/2010 | Peng |
| 7,714,071 | B2 | 5/2010 | Hoenig |
| 7,732,052 | B2 | 6/2010 | Chang |
| 7,737,061 | B2 | 6/2010 | Chang |
| 7,737,215 | B2 | 6/2010 | Chang |
| 7,741,397 | B2 | 6/2010 | Liang |
| 7,754,814 | B2 | 7/2010 | Barcus |
| 7,759,404 | B2 | 7/2010 | Burgun |
| 7,786,216 | B2 | 8/2010 | Soediono |
| 7,787,216 | B2 | 8/2010 | Soediono |
| 7,795,321 | B2 | 9/2010 | Cheung |
| 7,803,728 | B2 | 9/2010 | Poon |
| 7,811,644 | B2 | 10/2010 | DeBraal |
| 7,818,866 | B2 | 10/2010 | Hollis |
| 7,820,282 | B2 | 10/2010 | Haas |
| 7,825,166 | B2 | 11/2010 | Sasaki |
| 7,841,974 | B2 | 11/2010 | Hartjes |
| 7,842,770 | B2 | 11/2010 | Liang |
| 7,858,706 | B2 | 12/2010 | Arriola |
| 7,863,379 | B2 | 1/2011 | Kapur |
| 7,883,769 | B2 | 2/2011 | Seth |
| 7,893,166 | B2 | 2/2011 | Shan |
| 7,897,689 | B2 | 3/2011 | Harris |
| 7,906,587 | B2 | 3/2011 | Poon |
| 7,910,658 | B2 | 3/2011 | Chang |
| 7,915,192 | B2 | 3/2011 | Arriola |
| 7,918,005 | B2 | 4/2011 | Hollis |
| 7,918,016 | B2 | 4/2011 | Hollis |
| 7,922,071 | B2 | 4/2011 | Robertson |
| 7,922,971 | B2 | 4/2011 | Robertson |
| 7,928,162 | B2 | 4/2011 | Kiss |
| 7,935,740 | B2 | 5/2011 | Dang |
| 7,947,367 | B2 | 5/2011 | Poon |
| 7,951,882 | B2 | 5/2011 | Arriola |
| 7,977,397 | B2 | 7/2011 | Cheung |
| 7,989,543 | B2 | 8/2011 | Karjala |
| 7,993,254 | B2 | 8/2011 | Robertson |
| 7,998,579 | B2 | 8/2011 | Lin |
| 7,998,728 | B2 | 8/2011 | Rhoads |
| 8,003,176 | B2 | 8/2011 | Ylitalo |
| 8,003,744 | B2 | 8/2011 | Okamoto |
| 8,012,550 | B2 | 9/2011 | Ylitalo |
| 8,026,291 | B2 | 9/2011 | Handa |
| 8,043,695 | B2 | 10/2011 | Ballard |
| 8,067,319 | B2 | 11/2011 | Poon |
| 8,076,381 | B2 | 12/2011 | Miyagawa |
| 8,076,416 | B2 | 12/2011 | Ellul |
| 8,084,537 | B2 | 12/2011 | Walton |
| 8,087,147 | B2 | 1/2012 | Hollis |
| 8,105,459 | B2 | 1/2012 | Alvarez |
| 8,119,237 | B2 | 2/2012 | Peng |
| 8,124,234 | B2 | 2/2012 | Weaver |
| 8,173,233 | B2 | 5/2012 | Rogers |
| 8,198,374 | B2 | 6/2012 | Arriola |
| 8,211,982 | B2 | 7/2012 | Harris |
| 8,227,075 | B2 | 7/2012 | Matsushita |
| 8,273,068 | B2 | 9/2012 | Chang |
| 8,273,826 | B2 | 9/2012 | Walton |
| 8,273,838 | B2 | 9/2012 | Shan |
| 8,288,470 | B2 | 10/2012 | Ansems |
| 8,304,496 | B2 | 11/2012 | Weaver |
| 8,404,780 | B2 | 3/2013 | Weaver |
| 8,435,615 | B2 | 5/2013 | Tsuchida |
| 8,444,905 | B2 | 5/2013 | Li |
| 8,535,598 | B2 | 9/2013 | Imanari |
| 8,679,620 | B2 | 3/2014 | Matsushita |
| 8,715,449 | B2 | 5/2014 | Leser |
| 8,721,823 | B2 | 5/2014 | Vaideeswaran |
| 8,883,280 | B2 | 11/2014 | Leser |
| 9,067,705 | B2 | 6/2015 | Leser |
| 9,180,995 | B2 | 11/2015 | Iyori |
| 9,358,772 | B2 | 6/2016 | Leser |
| 9,447,248 | B2 | 9/2016 | Sun |
| 2001/0010848 | A1 | 8/2001 | Usui |
| 2001/0010849 | A1 | 8/2001 | Blizard |
| 2001/0038893 | A1 | 11/2001 | Mohan |
| 2001/0041236 | A1 | 11/2001 | Usui |
| 2002/0030296 | A1 | 3/2002 | Geddes |
| 2002/0035164 | A1 | 3/2002 | Wu |
| 2002/0041046 | A1 | 4/2002 | Hartjes |
| 2002/0058126 | A1 | 5/2002 | Kannankeril |
| 2002/0122905 | A1 | 9/2002 | Andersson |
| 2002/0135088 | A1 | 9/2002 | Harfmann |
| 2002/0137851 | A1 | 9/2002 | Kim |
| 2002/0144769 | A1 | 10/2002 | Debraal |
| 2002/0172818 | A1 | 11/2002 | DeBraal |
| 2003/0003251 | A1 | 1/2003 | DeBraal |
| 2003/0017284 | A1 | 1/2003 | Watanabe |
| 2003/0021921 | A1 | 1/2003 | DeBraal |
| 2003/0029876 | A1 | 2/2003 | Giraud |
| 2003/0069362 | A1 | 4/2003 | Ramanathan |
| 2003/0108695 | A1 | 6/2003 | Freek |
| 2003/0114594 | A1 | 6/2003 | Starita |
| 2003/0138515 | A1 | 7/2003 | Harfmann |
| 2003/0211310 | A1 | 11/2003 | Haas |
| 2003/0228336 | A1 | 12/2003 | Gervasio |
| 2003/0232210 | A1 | 12/2003 | Haas |
| 2004/0013830 | A1 | 1/2004 | Nonomura |
| 2004/0031714 | A1 | 2/2004 | Hanson |
| 2004/0037980 | A1 | 2/2004 | DeBraal |
| 2004/0038018 | A1 | 2/2004 | Anderson |
| 2004/0062885 | A1 | 4/2004 | Imanari |
| 2004/0115418 | A1 | 6/2004 | Anderson |
| 2004/0147625 | A1 | 7/2004 | Dostal |
| 2004/0170814 | A1 | 9/2004 | VanHandel |

(56) References Cited

U.S. PATENT DOCUMENTS

| | | |
|---|---|---|
| 2005/0003122 A1 | 1/2005 | Debraal |
| 2005/0006449 A1 | 1/2005 | DAmato |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0091576 A1 | 5/2006 | Takase |
| 2006/0094577 A1 | 5/2006 | Mannlein |
| 2006/0095151 A1 | 5/2006 | Mannlein |
| 2006/0108409 A1 | 5/2006 | Pyper |
| 2006/0135679 A1 | 6/2006 | Winowiecki |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | LiPiShan |
| 2008/0020162 A1 | 1/2008 | Fackler |
| 2008/0044617 A1 | 2/2008 | Schmitz |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0302800 A1 | 12/2008 | Chou |
| 2008/0311812 A1 | 12/2008 | Arriola |
| 2009/0041965 A1 | 2/2009 | Kochem |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0116422 A1 | 5/2010 | Vaideeswaran |
| 2010/0137118 A1 | 6/2010 | Chang |
| 2010/0147447 A1 | 6/2010 | Mazzarolo |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0282759 A1 | 11/2010 | Eckhardt |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0129656 A1 | 6/2011 | Zur |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |

(56) References Cited

U.S. PATENT DOCUMENTS

| | | |
|---|---|---|
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bemreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |
| 2016/0355659 A1 | 12/2016 | Sun |

FOREIGN PATENT DOCUMENTS

| | | |
|---|---|---|
| CA | 2765489 | 12/2010 |
| CN | 1288427 | 3/2001 |
| CN | 1495100 | 5/2004 |
| CN | 1523051 | 8/2004 |
| CN | 1942370 | 4/2007 |
| CN | 101044195 | 9/2007 |
| CN | 101104716 | 1/2008 |
| CN | 101352923 | 1/2009 |
| CN | 101370873 | 2/2009 |
| CN | 101429309 | 5/2009 |
| CN | 101531260 | 9/2009 |
| CN | 101538387 | 9/2009 |
| CN | 101560307 | 10/2009 |
| CN | 201347706 Y | 11/2009 |
| CN | 102030960 | 4/2011 |
| CN | 102089370 | 6/2011 |
| CN | 102115561 | 7/2011 |
| CN | 102245368 | 11/2011 |
| CN | 102391570 | 3/2012 |
| CN | 102762350 | 10/2012 |
| CN | 102892678 A | 1/2013 |
| DE | 2831240 | 1/1980 |
| DE | 2831240 C | 3/1988 |
| DE | 102006025612 A1 | 11/2007 |
| DE | 102008031812 | 12/2009 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 0879844 | 11/1998 |
| EP | 879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1472087 | 4/2006 |
| EP | 1666530 | 6/2006 |
| EP | 1754744 | 2/2007 |
| EP | 1921023 A1 | 5/2008 |
| EP | 1939099 | 7/2008 |
| EP | 0851805 | 12/2008 |
| EP | 2266894 | 12/2010 |
| EP | 2386584 A1 | 11/2011 |
| EP | 2386601 | 11/2011 |
| EP | 1040158 | 4/2012 |
| EP | 1749635 | 9/2012 |
| EP | 2323829 | 10/2012 |
| EP | 2141000 | 2/2014 |
| EP | 2720954 | 4/2014 |
| GB | 1078326 | 8/1967 |
| GB | 2322100 | 8/1998 |
| GB | 2485077 | 5/2012 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | 04278340 | 10/1992 |
| JP | H0543967 | 6/1993 |
| JP | 0615751 | 1/1994 |
| JP | 3140847 | 1/1994 |
| JP | 06192460 | 7/1994 |
| JP | H06322167 A | 11/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2001329099 A | 11/2001 |
| JP | 2003292663 | 10/2003 |
| JP | 2003321566 | 11/2003 |
| JP | 200418101 | 1/2004 |
| JP | 2004018101 | 1/2004 |
| JP | 2004067820 A | 3/2004 |
| JP | 2004137377 | 5/2004 |
| JP | 2004168421 A | 6/2004 |
| JP | 2004330464 | 11/2004 |
| JP | 2005138508 A | 6/2005 |
| JP | 2005272542 | 10/2005 |
| JP | 2006096390 | 4/2006 |
| JP | 2006130814 A | 5/2006 |
| JP | 2006142008 A | 6/2006 |
| JP | 200791323 | 4/2007 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| JP | 2011132420 A | 7/2011 |
| JP | 2011207958 A | 10/2011 |
| JP | 2011212968 A | 10/2011 |
| KR | 100306320 | 10/2001 |
| KR | 2003036558 | 5/2003 |
| KR | 2004017234 | 2/2004 |
| KR | 101196666 | 11/2012 |
| TW | 393427 | 6/2000 |
| TW | 200404848 | 4/2004 |
| TW | M362648 | 8/2009 |
| TW | 201021747 | 6/2010 |
| TW | 201309757 | 3/2013 |
| WO | 9113933 | 9/1991 |
| WO | 1991013933 | 9/1991 |
| WO | 9413460 | 6/1994 |
| WO | 1994013460 | 6/1994 |
| WO | 9729150 | 8/1997 |
| WO | 1998016575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 2003066320 | 8/2003 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007003523 | 1/2007 |
| WO | 2007020074 | 2/2007 |
| WO | 2007068766 | 6/2007 |
| WO | 2007090845 A2 | 8/2007 |

(56) References Cited

FOREIGN PATENT DOCUMENTS

| | | |
|---|---|---|
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010015673 | 2/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011038081 | 3/2011 |
| WO | 2011076637 | 6/2011 |
| WO | 2011141044 | 11/2011 |
| WO | 2011144705 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 | 12/2012 |
| WO | 2012174567 A2 | 12/2012 |
| WO | 2012174568 | 12/2012 |
| WO | 2013032552 | 3/2013 |
| WO | 2013101301 | 7/2013 |

OTHER PUBLICATIONS

Office Action dated Sep. 1, 2006 for U.S. Appl. No. 14/106,212.
Australian First Patent Examination Report for Application No. 2013359097 dated Aug. 26, 2016, 3 pages.
British Examination Report for GB Application No. GB1400762.9, dated Aug. 8, 2016, 2 pages.
Extended European Search Report for European Application No. 13863546.1 dated Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T dated Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dated Aug. 30, 2016, 6 pages.
Mexican Office Action for Mexican Application MX/a/2013/014993, 6 pages.
New Zealand Examination Report for New Zealanc Application No. 708463, 3 pages.
New Zealand Examination Report for New Zealand Application No. 708552, 4 pages.
New Zealand First Examination Report for New Zealand Application 708546, 4 pages.
Russian Office Action for Russian Application No. 2014101298, 6 pages.
European Examination Report for European App. No. 12727994.1, 4 pages.
Chinese Office Action for Chinese App. No. 201380065089.3, 12 pages.
Chinese Office Action for Chinese Application No. 201380065127.5, dated Jul. 26, 2016, 11 pages.
European Search Report for European App. No. 13849152.7, 3 pages.
Australian Patent Examination Report for Australian App. No. 2013334155 dated Oct. 24, 2016, 7 pages.
Taiwan Office Action for Taiwan Pat. App. No. 102146299, 7 pages.
Third Party Observation filed in European Patent App. No. 12727994.1, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, 4 pages.
British Examination Report for GB App. No. 1400762.9, 2 pages.
Chinese Office Action for Chinese Applicaiton 201380065781.6, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3, 9 pages.
Office Action dated Nov. 4, 2016 for U.S. Appl. No. 13/961,411.
Chinese Office Action for Chinese Application No. 201280051426.9, 9 pages.
English Summary of Chinese Office Action for Application Serial No. 201380041896.1, dated Nov. 11, 2016, 11 pages.
Extended European Search Report for European App. No. 14775300.8 dated Oct. 24, 16, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Taiwan Office Action for Taiwan App. No. 102146298 dated Oct. 26, 2016, 9 pages.
Shutov, Fyodor, "Foamed Polymers. Cellular Structure and Properties", Springer Berlin Heidelberg, Industrial Developments vol. 51, Jun. 2005, p. 176-182.
Gulf Cooperation Council Examination Report for GCC Patent App. No. GC2012-21529, 6 pages.
Office Action dated Dec. 28, 2016 for U.S. Appl. No. 14/106,276.
Spanish Search Report for Spanish App. No. 201490025, 5 pages.
Japanese Office Action for Japanese Patent App. 2014-516089 dated Dec. 20, 2016, 6 pages.
Chinese Office Action for Chinese App. No. 201380065089.3, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Mar. 14, 2017 for U.S. Appl. No. 14/475,266.
Office Action dated Mar. 21, 2017 for U.S. Appl. No. 14/475,411.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Extended European Search Report for European App. No. 14840353.8 dated Mar. 17, 2017, 6 pages.

(56) References Cited

OTHER PUBLICATIONS

Extended European Search Report for European App. No. 14838960.4 dated Mar. 17, 2017, 9 pages.
Extended European Search Report for European App. No. 14840262 dated Mar. 23, 2017, 8 pages.
New Zealand Examination Report for New Zealand Patent App. No. 712687 dated Mar. 30, 2017, 10 pages.
Office Action dated Apr. 21, 2017 for U.S. Appl. No. 14/475,411.
Taiwan Search Report for Taiwan Application No. 103109790 completed Apr. 20, 2017, 3 pages.
Extended European Search Report for European App. No. 14840734.9 dated Apr. 4, 2017, 10 pages.
Australian Examination Report for Australian App. No. 2014286957 dated May 2, 2017, 3 pages.
Office Action dated May 1, 2017 for U.S. Appl. No. 14/211,533.
Advisory Action dated Jun. 1, 2007 for U.S. Appl. No. 15/239,894; (pp. 1-6).
Office Action dated Jun. 7, 2017 for U.S. Appl. No. 15/388,319; (pp. 1-21).
Chinese Office Action for Chinese Application No. 201280051426.9, 12 pages.
Chinese Office Action for Chinese App. No. 201380041896.1 dated May 22, 2017, 9 pages.
Taiwan Office Action for Taiwan App. No. 101121655, 29 pages.
Australian Examiner's Report for Australian App. No. 2014244210, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.
New Zealand Examination Report for New Zealand Application 708546, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.
Office Action dated Aug. 18, 2015 for U.S. Appl. No. 14/106,212.
Office Action dated Aug. 27, 2015 for U.S. Appl. No. 14/106,358.
Office Action dated May 19, 2015 for Chinese Application No. 201280035667.4.
Office Action dated Oct. 27, 2015 for U.S. Appl. No. 14/462,073.
Office Action dated Oct. 8, 2015 for U.S. Appl. No. 14/188,504.
Second Chinese Office Action dated Sep. 6, 2015 for Chinese Application Serial No. 201280034350.9.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
Inter Partes Review Petition for US. Pat. No. 8,883,280 (712 pages) [Submitted in multiple parts].
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).
Gibson and Ashby, Cellular solids: structure and properties, 2nd ed., Cambridge University Press (1997) (7 pages).
C. Maier and T. Calafut, Polypropylene: the Definitive User's Guide and Databook, Plastics Design Library, William Andrew Inc. (1998) (19 pages).
Reichelt et al., 'PP-Blends with Tailored Foamability and Mechanical Properties', Cellular Polymers, vol. 22, No. 5, 2003, 14 pages.

Ratzsch et al., 'Radical reactions on polypropylene in the solid state', Prog Polym. Sci. 27 (2002) 1195-1282, 88 pages.
Excerpts from Encyclopedia of Polymer Science and Technology: Plastics, Resins, Rubbers, and Fibers, 'Blowing Agents', vol. 2, John Wiley & Sons, Inc. (1965), 37 pages.
Excerpts from Polymer Foams: Science and Technology, Lee et al., 'Introduction to Polymeric Foams', CRC Press (2007) 51 pages.
Grant & Hackh's Chemical Dictionary, 5th ed., McGraw-Hill, Inc. (1987) (3 pages).
Merriam-Webster's Collegiate Dictionary, 11th ed. (2003), p. 70 (3 pages).
Merriam-Webster's Collegiate Dictionary, 11th ed. (2003), p. 1237 (3 pages).
Hawley's Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly™ HMS Polypropylene for Foam Extrusion" obtained from Borealis webpage obtained from the Internet Archive's "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf)("Brochure '08") (20 pages).
Office Action dated Dec. 31, 2015 for U.S. Appl. No. 14/755,546.
English translation of First Office Action for Taiwanese Application No. 101121656, dated Nov. 13, 2015.
Singapore Notice of Eligibility for Grant, Search Report, and Examination Report dated Dec. 10, 2015 for Singapore Application No. 11201503336V.
Office Action dated Jan. 11, 2016 for U.S. Appl. No. 14/161,328.
English Summary of Russian Office Action for Application Serial No. 2014111340, dated February 25, 2016, 8 pages.
United Kingdom Examination Report for Patent Application No. GB14007629 dated Feb. 11, 2016.
Office Action dated Feb. 16, 2016 for U.S. Appl. No. 14/108,142.
Extended European Search Report for European Application No. 13849152.7-1303/2912142 PCT/US2013/066811, dated Feb. 12, 2016.
English summary of Spanish Office Action for Application Serial No. P201490025, dated Feb. 9, 2016, 8 pages.
Supplemental European Search Report for European Application No. 12727994.1-1302, dated Feb. 17, 2016.
English summary of Chinese Office Action for Chinese Application Serial No. 201380065781.6, dated Apr. 19, 2016, 14 pages.
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), 'Standard Method for High-Speed Puncture Properties of Plastics Using Load and Displacement Sensors' (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.

(56) References Cited

OTHER PUBLICATIONS

Almanza et al., 'Applicability of the Transient Plane Source Method to Measure the Thermal Conductivity of Low-Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
Power of a Microwave Oven, available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Certified English translation of JP2003292663.
Office Action Chinese Patent Application No. 201280051426.9 dated Jul. 23, 2015.
Japanese Office Action for Japanese App. No. 2014-528384, 15 pages.
Singapore Office Action and Written Opinion for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 dated Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Australian First Examination Report for Australian App. No. 2014311414 dated Feb. 7, 2017, 3 pages.

(56) References Cited

OTHER PUBLICATIONS

Extended European Search Report for European App. No. 14823298.6 dated Jan. 25, 2017, 9 pages.
Office Action dated Feb. 16, 2017 for U.S. Appl. No. 15/239,894.
Cheng et al., "Improving processability of polyethylenes by radiation-induced long-chain branching," Radiation Physics and Chemistry, 78 (2009) pp. 563-566.
Chinese Office Action for Application Serial No. 201480021009.9, dated Jan. 22, 2017 including English language summary, 22 pages.
Chinese Office Action for Chinese App. No. 201480047978.1, 14pages.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546, 2 pages.
Singapore Office Action and Written Opinion dated Dec. 13, 2016 for Singapore Application No. 11201504333Y, 6 pages.
Office Action for Chinese Patent Application No. 201380065116.7, dated March 1, 2017, 9 pages.
Office Action dated March 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action dated Mar. 10, 2017 for Chinese Patent Application 201480007369.3, 11 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
Chinese Office Action for Application Serial No. 201480021009.9, dated Aug. 7, 2017 including English language summary, 12 pages.
Office Action dated Jul. 10, 2017 for U.S. Appl. No. 15/239,894; (pp. 1-10).
Office Action dated Jul. 19, 2017 for U.S. Appl. No. 15/059,995; (pp. 1-10).
Chinese Office Action for Chinese App. No. 201480047578.0 dated Jul. 4, 2017, 5 pages.
Chinese Office Action for Chinese App. No. 201480047978.1, 11 pages.
Taiwan Office Action for Taiwan App. No. 102138786, 25 pages.
Dffice Action dated Aug. 22, 2017 for U.S. Appl. No. 14/188,504; (pp. 1-9).
Australian Examination REport for Australian App. No. 2016204692, 3 pages.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasellcom/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.

A. R. Katritzky et al., "Correlation and Prediction of the Refractive Indices of Polymers by QSPR," J. Chem. Inf. Comput. Sci., 38 (1998), 1171-1176.
M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, dated Apr. 27, 2016, 5 pages.
Japanese Office Action for Japanese Patent Application No. 2014-528384, dated Mar. 1, 2016.
International Preliminary Report on Patentability dated Feb. 16, 2016, relating to International Application No. PCT/US2014/051508.
English Summary of Chinese Office Action for Application Serial No. 201380041896.1, dated Mar. 18, 2016, 7 pages.
Extended European Search Report for European Application No. 13827981.5-1708/2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, dated Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/462,073.
Notice of Acceptance dated Jun. 10, 2016 for Australian Application No. 2012302251.
Office Action dated Jul. 28, 2016 for U.S. Appl. No. 14/211,553.

(56) References Cited

OTHER PUBLICATIONS

Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Extended European Search Report for European Application No. 13863308.6 dated Jul. 19, 2016, 8 pages.
Office Action dated Aug. 11, 2016 for U.S. Appl. No. 14/108,110.
Taiwan Office Action for Taiwan Pat. App. No. 101121656 dated Aug. 1, 2017, 16 pages.
Office Action dated Oct. 18, 2017 for U.S. Appl. No. 14/063,252; (pp. 1-17).
Chinese Office Action for Chinese Application No. 201380065127.5 dated Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424 (pp. 1-6).
Extended European Search Report for European App. No. 17182869.2 dated Oct. 19, 2017, 5 pages.
Extended European Search Report for European App. No. 17181231.6 dated Nov. 7, 2017, 5 pages.
Australian First Patent Examination Report for Australian App. No. 2014311991 dated Oct. 4, 2017, 4 pages.
Office Action dated Oct. 3, 2017 for U.S. Appl. No. 15/491,443 (pp. 1-6).
Office Action dated Oct. 27, 2017 for U.S. Appl. No. 15/239,894; (pp. 1-7).
Office Action dated Nov. 14, 2017 for U.S. Appl. No. 14/862,552 (pp. 1-14).
"All You Need to Know About Polypropylene, Part 1," Creative Mechanisms Blog. (Year: 2016).
Rejection Decions for Chinese Patent App. No. 201280051426.9, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.

ASTM D4101-11, an American Society for Testing and Materials "Standard Standard Specification for Polypropylene Injection and Extrusion Materials," 2011, 17 pages.
Chinese Office Action for Chinese App. No. 201480047976.2, 15 pages.
Dongwu Yang, Plastic Material Selection Technology, Light Industry Press, Jan. 2008, 1 page.
German Office Action for German App. No. 11 2012 002 042.1, 20 pages.
Chinese Office Action dated Sep. 21, 2017 for Chinese Patent Application 201480007369.3, 4 pages.
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Chinese App. No. 20180042446.9 dated Feb. 3, 2018, 9 pages.
Chinese Office Action for Chinese App. No. 20180039581.8 dated Feb. 23, 2018, 13 pages.
Chinese Office Action for Chinese App. No. 201480047978.1 dated Feb. 24, 2018, 11 pages.
Chinese Final Rejection for Chinese App. No. 201480047976.2 dated Mar. 7, 2018, 8 pages.
Vasile et al., Practical Guide to Polyethylene, published by Smithers Rapra Press, 2008, p. 119, 3 pages.
Canadian Examiner's Report for Canadian App. No. 2845225 dated Feb. 6, 2017, 5 pages.
Taiwan Office Action for Taiwan App. No. 103128338 dated Feb. 21, 2018, 9 pages.
Japanese Office Action for Japanese Patent App. No. 2015-539838 dated Feb. 27, 2018, 10 pages.
Taiwan Office Action for Taiwan App. No. 102138786 dated Mar. 1, 2018, 20 pages.
Chinese Office Action dated Mar. 22, 2018 for Chinese Patent Application 201480007369.3, 5 pages.
Office Action dated Mar. 29, 2018 for U.S. Appl. No. 14/862,552, (pp. 1-10).
Extended European Search Report for European App. No. 14836418.5 dated Jan. 30, 2018, 4 pages.
Canadian office action for Canadian App. No. 2,842,325 dated Jan. 24, 2018, 4 pages.
Japanese Office Action for Japanese App. No. 2016-501945 dated Jan. 23, 2018.
European Examination Report for European App. No. 13849152.7 dated Jan. 4, 2018, 3 pages.
"All you need to know about Polypropylene, Part 1," Creative Mechanisms. (Year: 2017), 6 pages.
Chinese Office Action for Chinese App. No. 201380065781.6 dated Nov. 28, 2017, 10 pages.
"Polypropylene, Impact Copolymer," Lyondell Basell. (Year: 2017).
Office Action dated Jan. 16, 2018 for U.S. Appl. No. 15/388,319; (pp. 1-13).
Office Action dated Jan. 19, 2018 for U.S. Appl. No. 15/004,263; (pp. 1-18).
Chinese Office Action for Chinese App. No. 201480047578.0 dated Jan. 24, 2018, 10 pages.

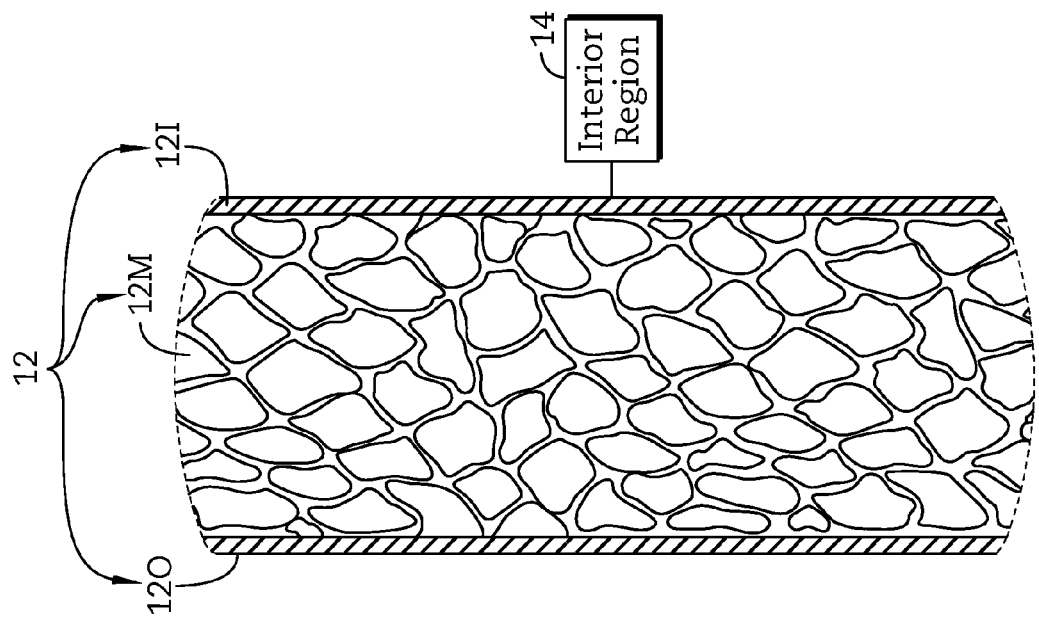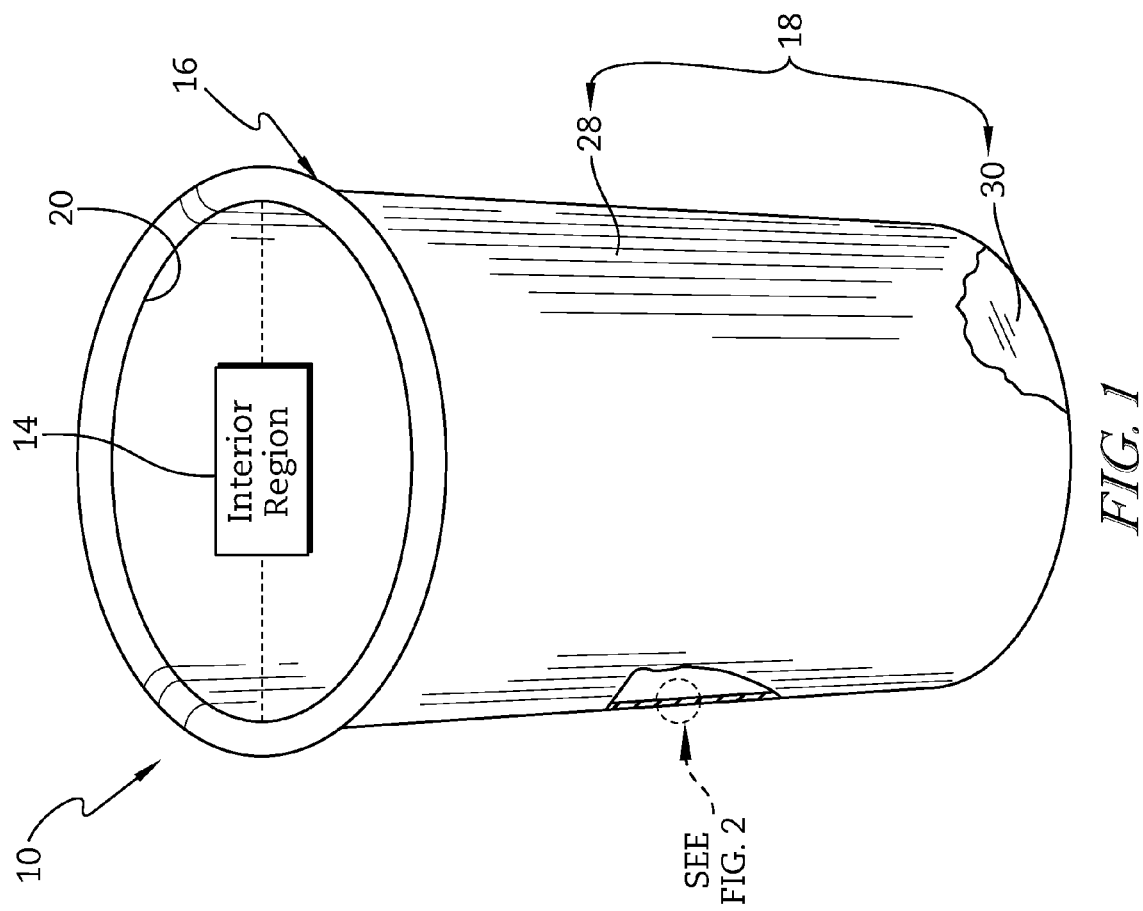

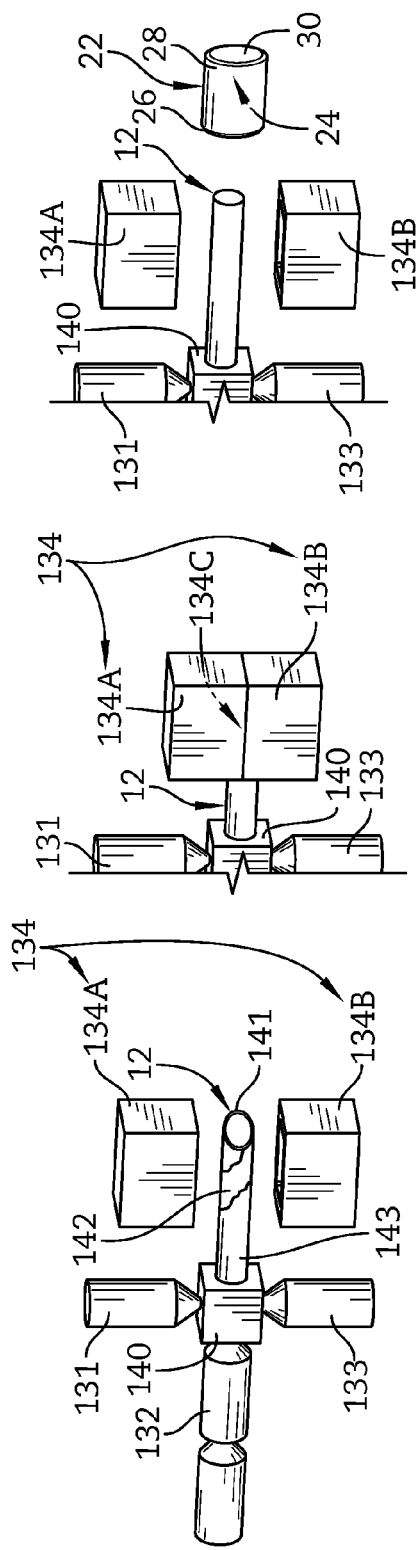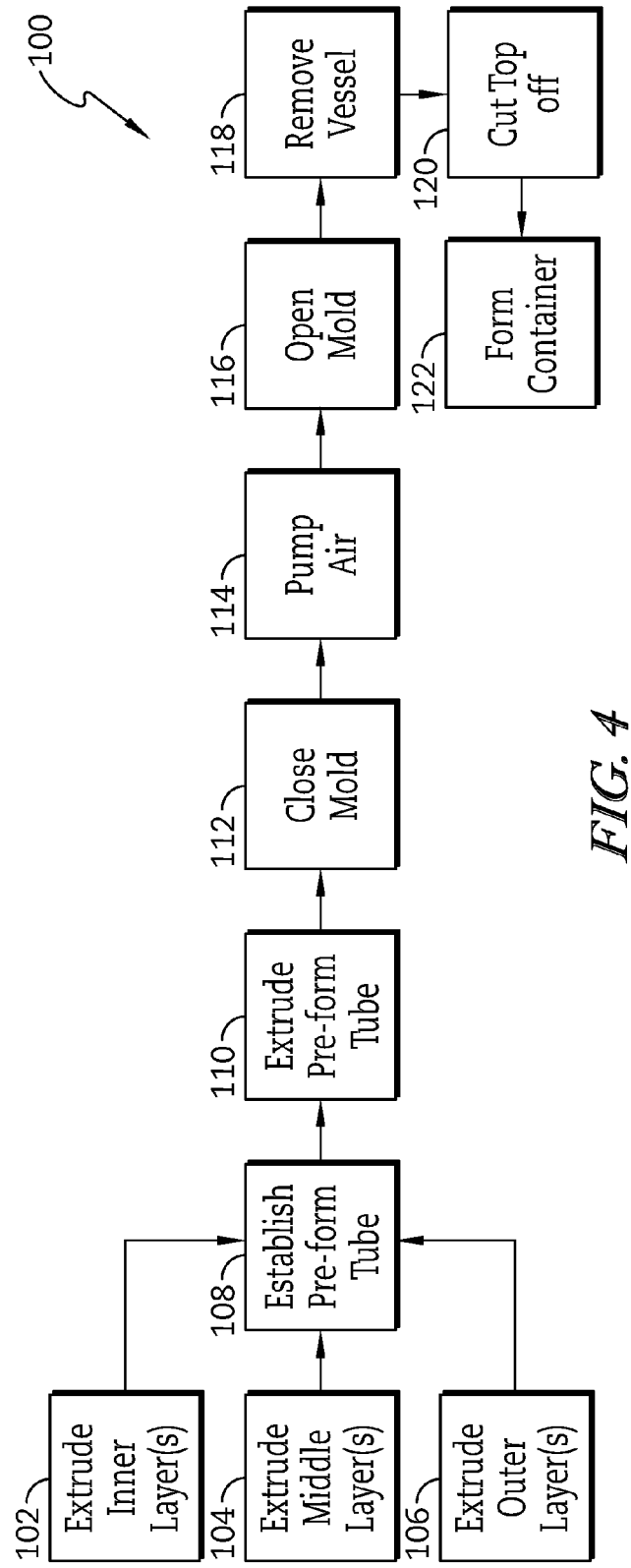

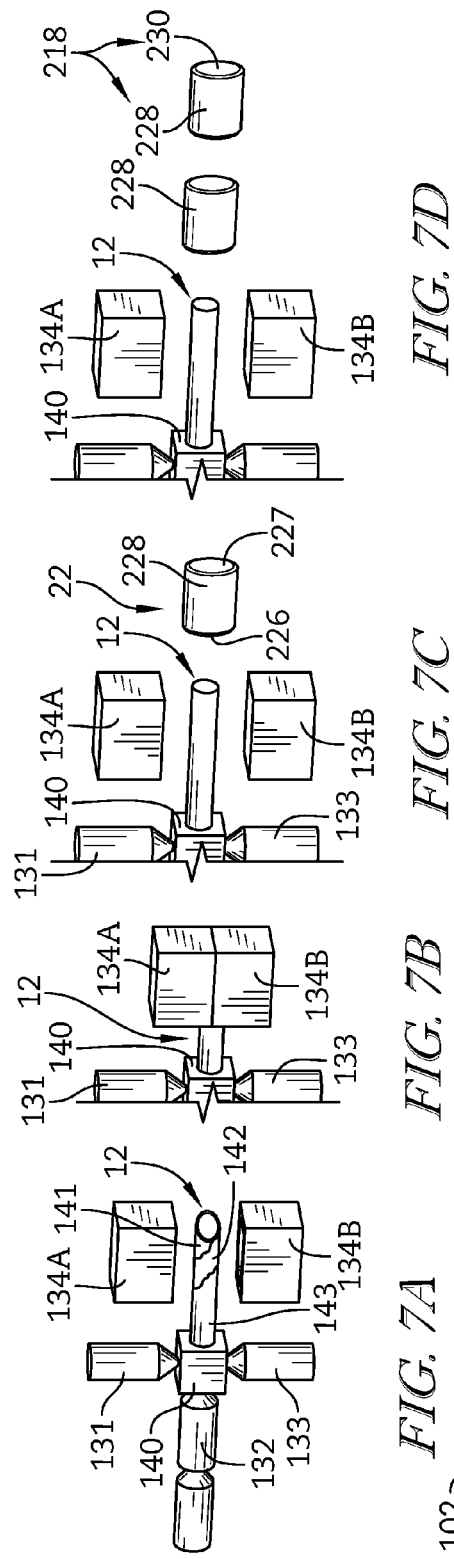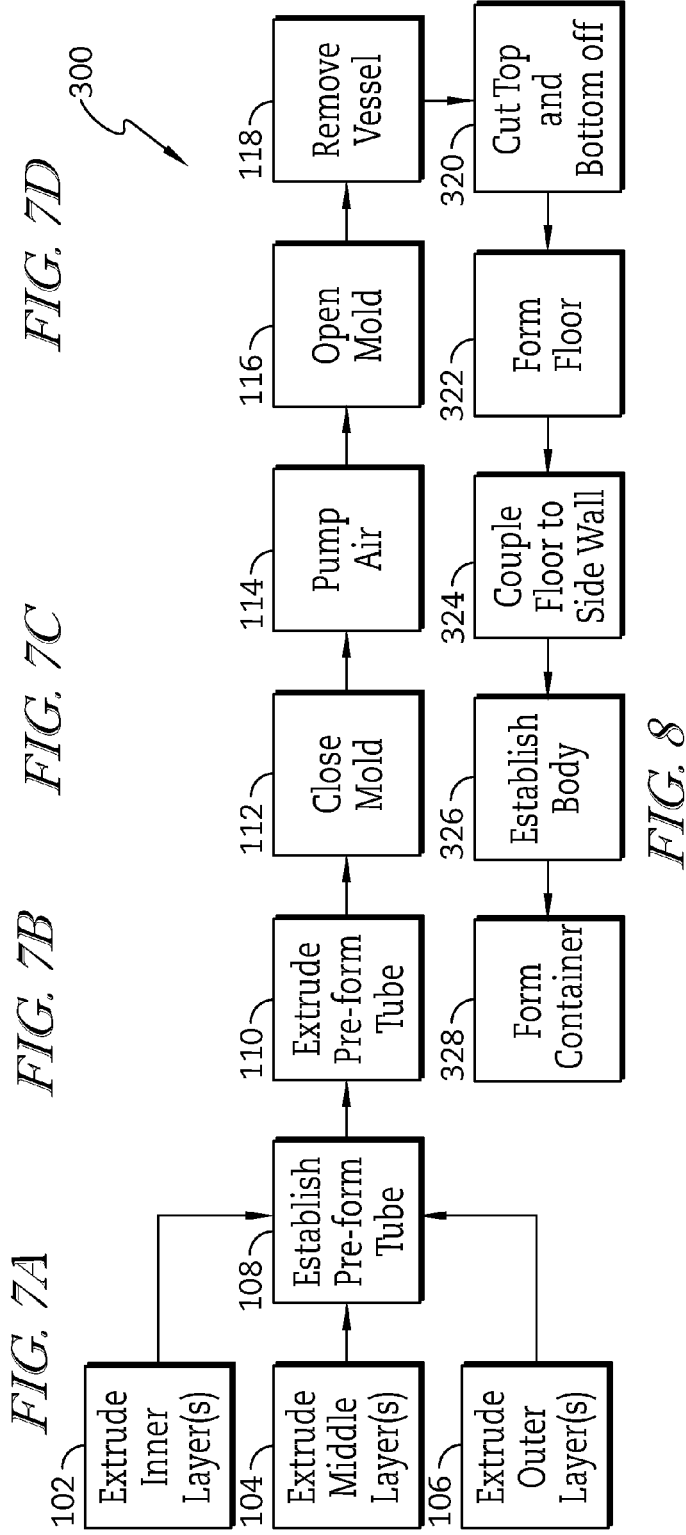

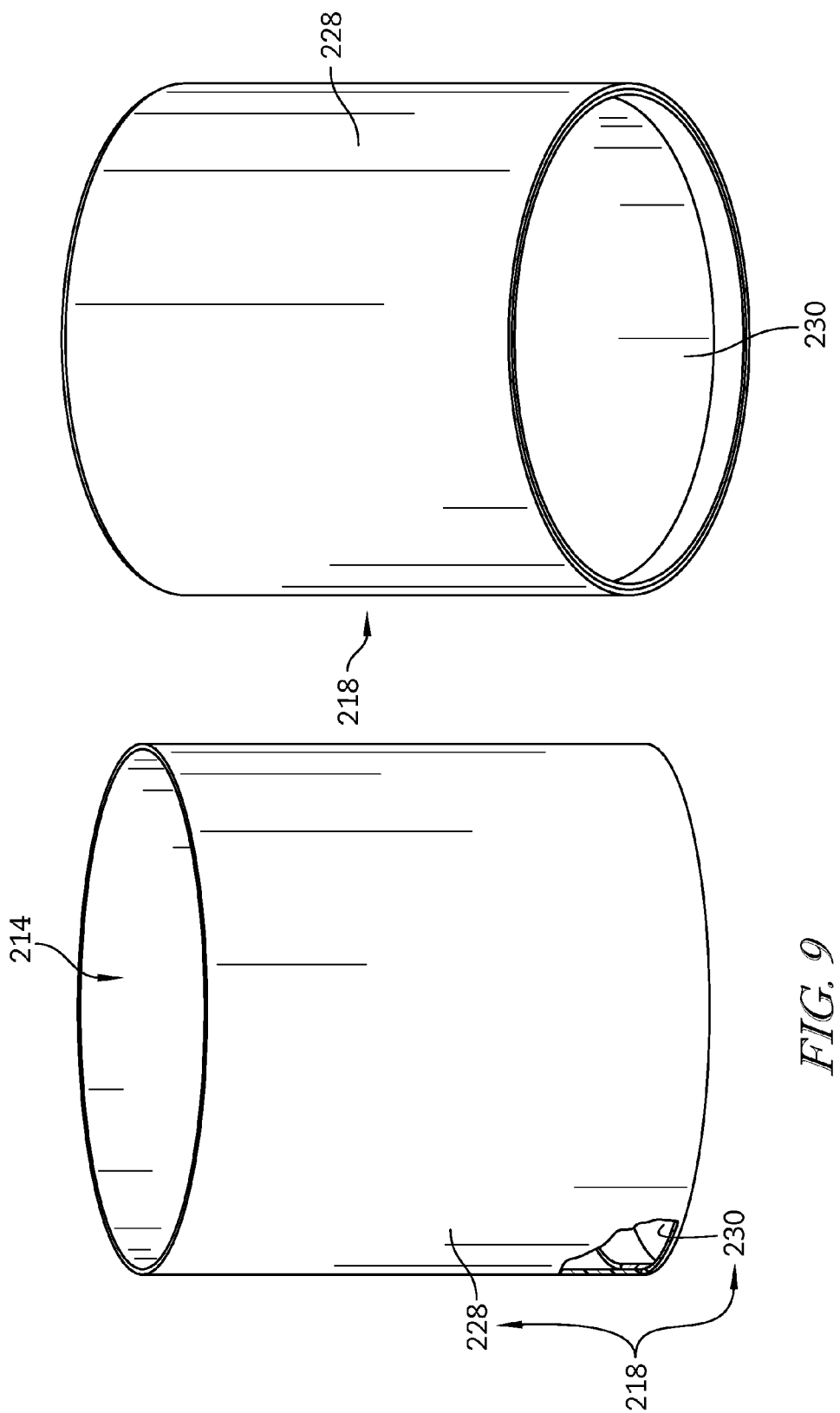

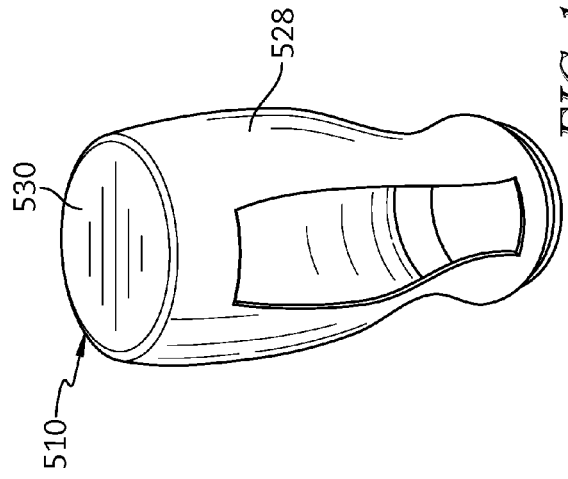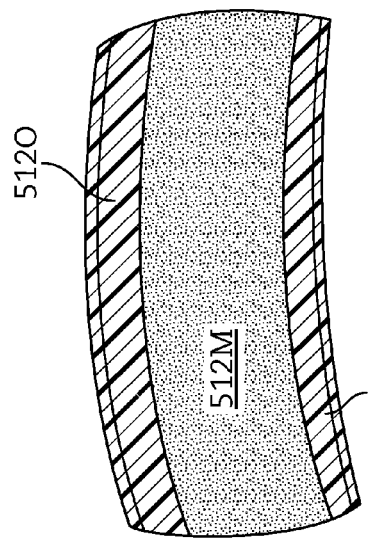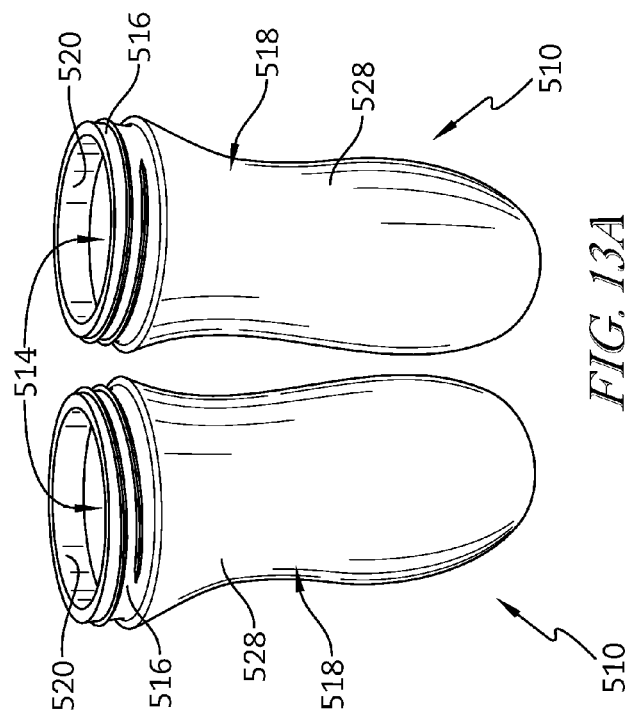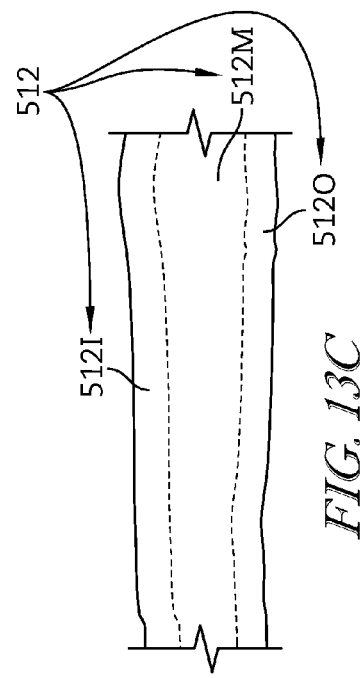
FIG. 13A
FIG. 13B
FIG. 13C
FIG. 13D

CONTAINER

PRIORITY CLAIM

This application is a continuation of U.S. application Ser. No. 14/787,901, filed Oct. 29, 2015, which claims priority to International (PCT) Application No. PCT/US14/027,551, filed Mar. 14, 2014, which claims priority to U.S. Provisional Application Ser. No. 61/783,994, filed Mar. 14, 2013, each of which is expressly incorporated by reference herein.

BACKGROUND

The present disclosure relates to vessels, and in particular to cup or bottles. More particularly, the present disclosure relates to a cup formed from polymeric materials.

SUMMARY

A vessel in accordance with the present disclosure is configured to hold a product in an interior region. In illustrative embodiments, the vessel is an insulated container such as a drink cup. In illustrative embodiments, the vessel is a container such as a shampoo bottle.

In illustrative embodiments, a container is formed multi-layer tube in a multi-layer co-extrusion blow molding process. The multi-layer tube includes an inner polymeric layer, an outer polymeric spaced apart from the inner polymeric material, and a middle cellular non-aromatic polymeric material located between the inner and outer polymeric layers.

In illustrative embodiments, the middle cellular non-aromatic polymeric layer has a density in a range of about 0.01 $g/cm^3$ to about 0.19 $g/cm^3$. In illustrative embodiments, the middle cellular non-aromatic polymeric layer has a density in a range of about 0.05 $g/cm^3$ to about 0.19 $g/cm^3$. In illustrative embodiments, the middle cellular non-aromatic polymeric layer has a density in a range of about 0.1 $g/cm^3$ to about 0.185 $g/cm^3$.

In a further embodiment, a vessel comprises a floor and a sidewall. A side wall is coupled to the floor and arranged to extend upwardly from ground underlying the floor. The side wall and the floor cooperate to define an interior product-storage region therebetween.

In a further embodiment, the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer.

In a further embodiment, the middle cellular non-aromatic polymeric material has a density in a range of about 0.01 $g/cm^3$ to about 0.19 $g/cm^3$.

In a further embodiment, the middle cellular non-aromatic polymeric material comprises polypropylene.

In a further embodiment, the density of the middle cellular non-aromatic polymeric material is in a range of about 0.1 $g/cm^3$ to about 0.185 $g/cm^3$.

In a further embodiment, each of the inner polymeric layer, the outer polymeric layer comprise polypropylene.

In a further embodiment, each of the inner polymeric layer, the outer polymeric layer comprise polypropylene.

In a further embodiment, the middle cellular non-aromatic polymeric material comprises high-density polyethylene.

In a further embodiment, the density of the middle cellular non-aromatic polymeric material is in a range of about 0.1 $g/cm^3$ to about 0.185 $g/cm^3$.

In a further embodiment, each of the inner polymeric layer, the outer polymeric layer comprise polypropylene.

In a further embodiment, the density of the middle cellular non-aromatic polymeric material is in a range of about 0.1 $g/cm^3$ to about 0.185 $g/cm^3$.

In a further embodiment, each of the inner polymeric layer, the outer polymeric layer, and the middle cellular non-aromatic polymeric material comprises polypropylene.

In a further embodiment, the vessel further comprises a brim coupled to an upper portion of the side wall and formed to include a mouth opening into the interior product-storage region.

In a further embodiment, the brim is coupled to each of the inner polymeric layer and the outer polymeric layer to close an annular opening into a portion of the core chamber formed in the side wall.

In a further embodiment, the middle cellular non-aromatic polymeric material is the only material located in the core chamber.

In a further embodiment, the middle cellular non-aromatic polymeric material is arranged to fill the core chamber completely.

In a further embodiment, the middle cellular non-aromatic polymeric material comprises polypropylene.

In a further embodiment, the density of the middle cellular non-aromatic polymeric material is in a range of about 0.1 $g/cm^3$ to about 0.185 $g/cm^3$.

In a further embodiment, each of the inner polymeric layer, the outer polymeric layer comprise polypropylene.

In a further embodiment, a vessel comprises a floor and a side wall. The side wall is coupled to the floor and arranged to extend upwardly from ground underlying the floor. The side wall cooperates with the floor to define an interior product-storage region therebetween.

In a further embodiment, the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer.

In a further embodiment, the inner polymeric layer, the outer polymeric layer, and a middle cellular non-aromatic polymeric material cooperate to provide means for maximizing a compressive strength of the vessel as tested by top-load testing and a shear strength of the vessel as tested by side-wall rigidity testing while minimizing a weight of the vessel.

In a further embodiment, the middle cellular non-aromatic polymeric material comprises polypropylene.

In a further embodiment, the density of the middle cellular non-aromatic polymeric material is in a range of about 0.1 $g/cm^3$ to about 0.185 $g/cm^3$.

In a further embodiment, the vessel has an average density in a density range of about 0.51 $g/cm^3$ to about 0.91 $g/cm^3$.

In a further embodiment, the compression strength of the vessel is greater than a compression strength of a control vessel having a mass about the same as a mass of the vessel and a shape about the same as a shape of the vessel.

In a further embodiment, the compression strength of the vessel is about 5% to about 30% greater than the compression strength of the control vessel.

In a further embodiment, the shear strength of the vessel is greater than a shear strength of a control vessel having a mass about the same as a mass of the vessel and a shape about the same as a shape of the vessel.

In a further embodiment, the compression strength of the vessel is about 3% to about 30% greater the compression strength of the control vessel.

In a further embodiment, the average density is about 0.91 g/cm$^3$.

In a further embodiment, the compression strength of the vessel is about 9% greater than a compression strength of a control vessel having a mass about the same as a mass of the vessel a shape about the same as a shape of the vessel.

In a further embodiment, the shear strength of the vessel is about 4% greater than a shear strength of a control vessel having a mass about the same as a mass of the vessel and a shape about the same as a shape of the vessel.

In a further embodiment, the density range is about 0.6 g/cm$^3$ to about 0.8 g/cm$^3$.

In a further embodiment, the average density is about 0.61 g/cm$^3$.

In a further embodiment, the compression strength of the vessel is about 15% greater than a compression strength of a control vessel having a mass about the same as a mass of the vessel a shape about the same as a shape of the vessel.

In a further embodiment, the shear strength of the vessel is about 15% greater than a shear strength of a control vessel having a mass about the same as a mass of the vessel and a shape about the same as a shape of the vessel.

In a further embodiment, the average density is about 0.71 g/cm$^3$.

In a further embodiment, the compression strength of the vessel is about 26% greater than a compression strength of a control vessel having a mass about the same as a mass of the vessel and a shape about the same as a shape of the vessel.

In a further embodiment, the shear strength of the vessel is about 24% greater than a shear strength of a control vessel having a mass about the same as a mass of the vessel and a shape about the same as a shape of the vessel.

In a further embodiment, the shear strength of the vessel is about 24% greater than a shear strength of a control vessel having a mass about the same as a mass of the vessel and a shape about the same as a shape of the vessel.

In a further embodiment, the vessel has a mass of about 56 grams.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a first embodiment of a container in accordance with the present disclosure showing that the container includes, from top to bottom, a brim, a side wall, and a floor, and suggesting that the container is formed from a multilayer tube according to a container-manufacturing process as suggested in FIGS. 3A-4;

FIG. 2 is an enlarged sectional view of a portion of a side wall included in the container of FIG. 1 showing that the side wall is made form a multilayer tube that includes, from left to right, an outer polymeric layer, a middle cellular non-aromatic polymeric layer, and an inner polymeric layer;

FIGS. 3A-3C are a series of partial perspective view of a first embodiment of a container-manufacturing process in accordance with the present disclosure showing the formation of the container of FIG. 1;

FIG. 3A is a partial perspective view of a portion of the container-manufacturing process showing that the container-manufacturing process begins with extruding an inner layer, a middle layer, and an outer layer to establish a multi-layer tube that is received between two mold halves for forming as suggested in FIG. 3B;

FIG. 3B is a view similar to FIG. 3A showing the two mold halves in a closed position trapping the multilayer tube therebetween in a mold cavity formed by the two mold have when the two mold have are closed;

FIG. 3C is a view similar to FIG. 3B showing the two mold halves in an opened position and a molded vessel being ejected from the mold halves for further processing to establish the container of FIG. 1 as suggested in FIG. 4;

Figure 6:
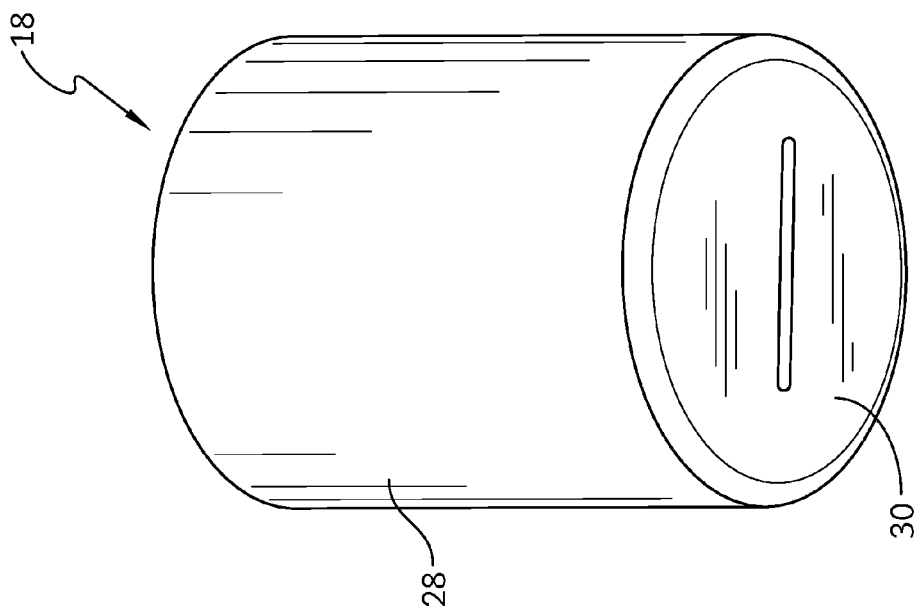
Figure 5:
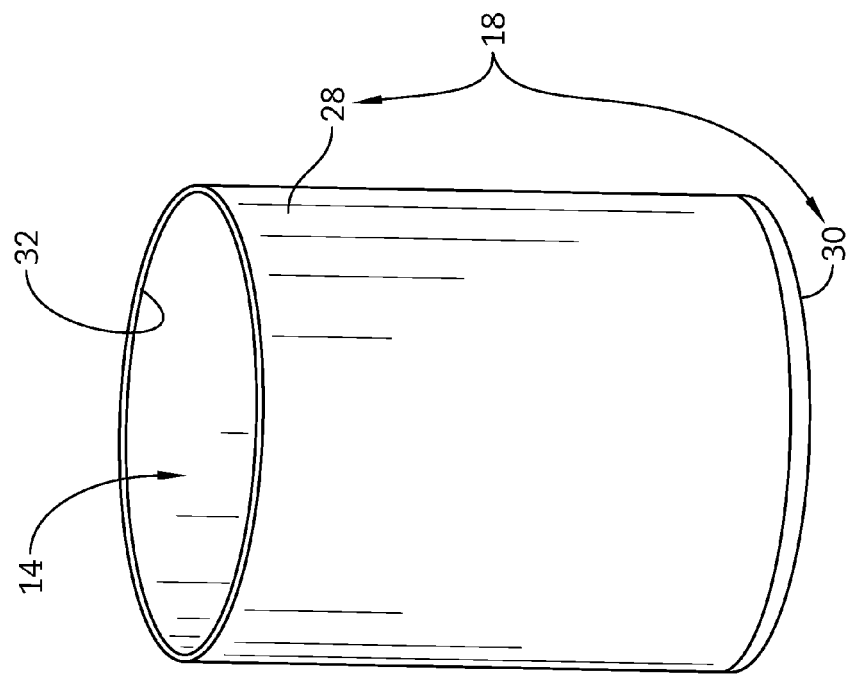
Figure 12:
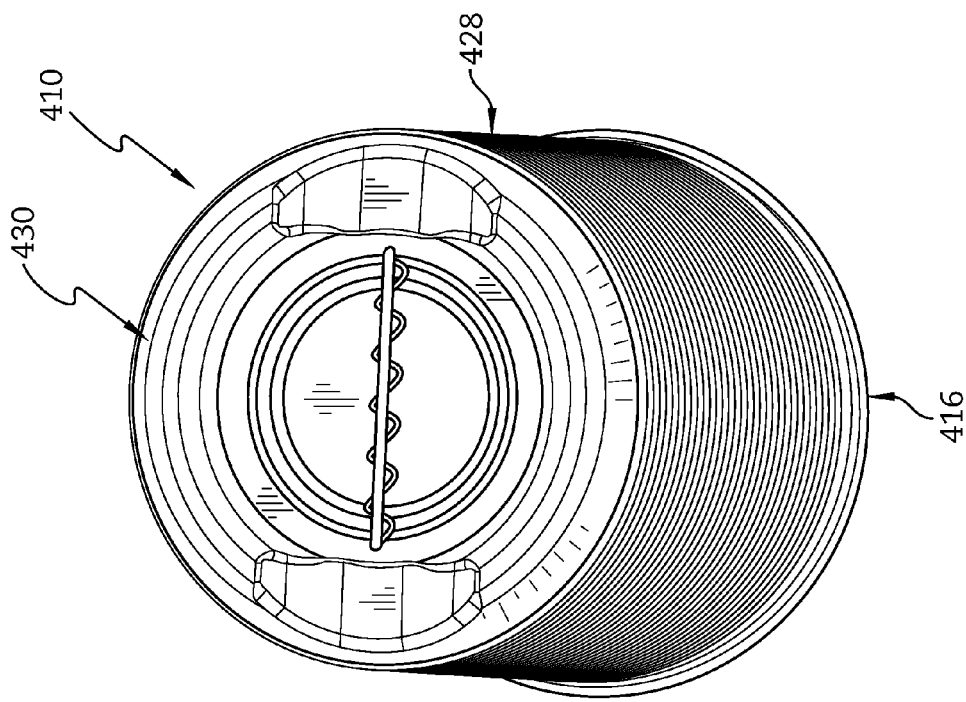
Figure 11:
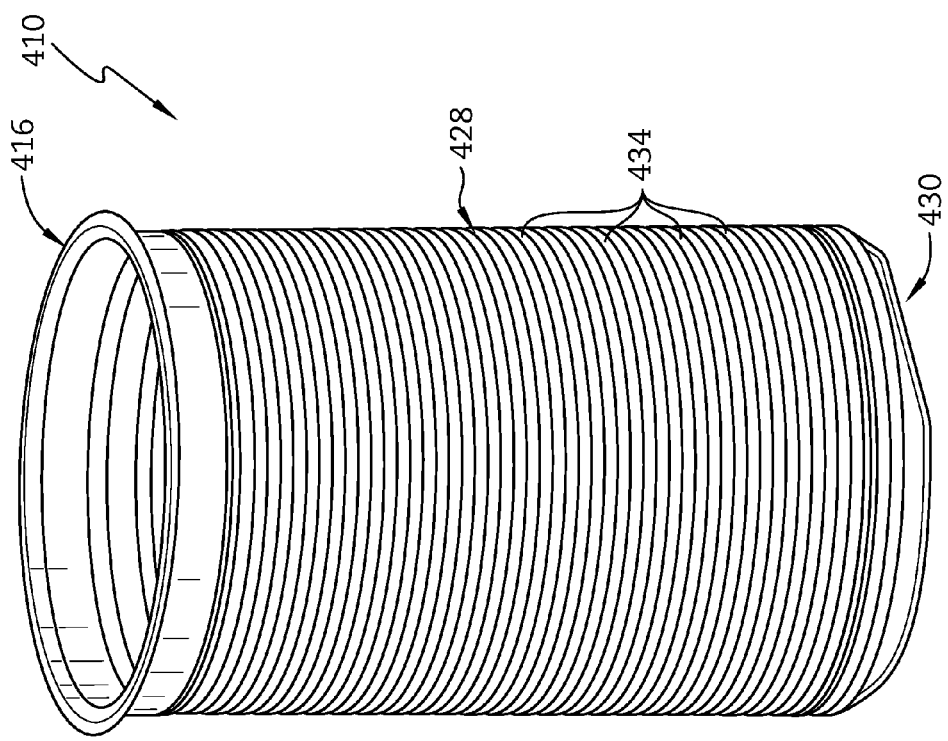
Figure 13E:
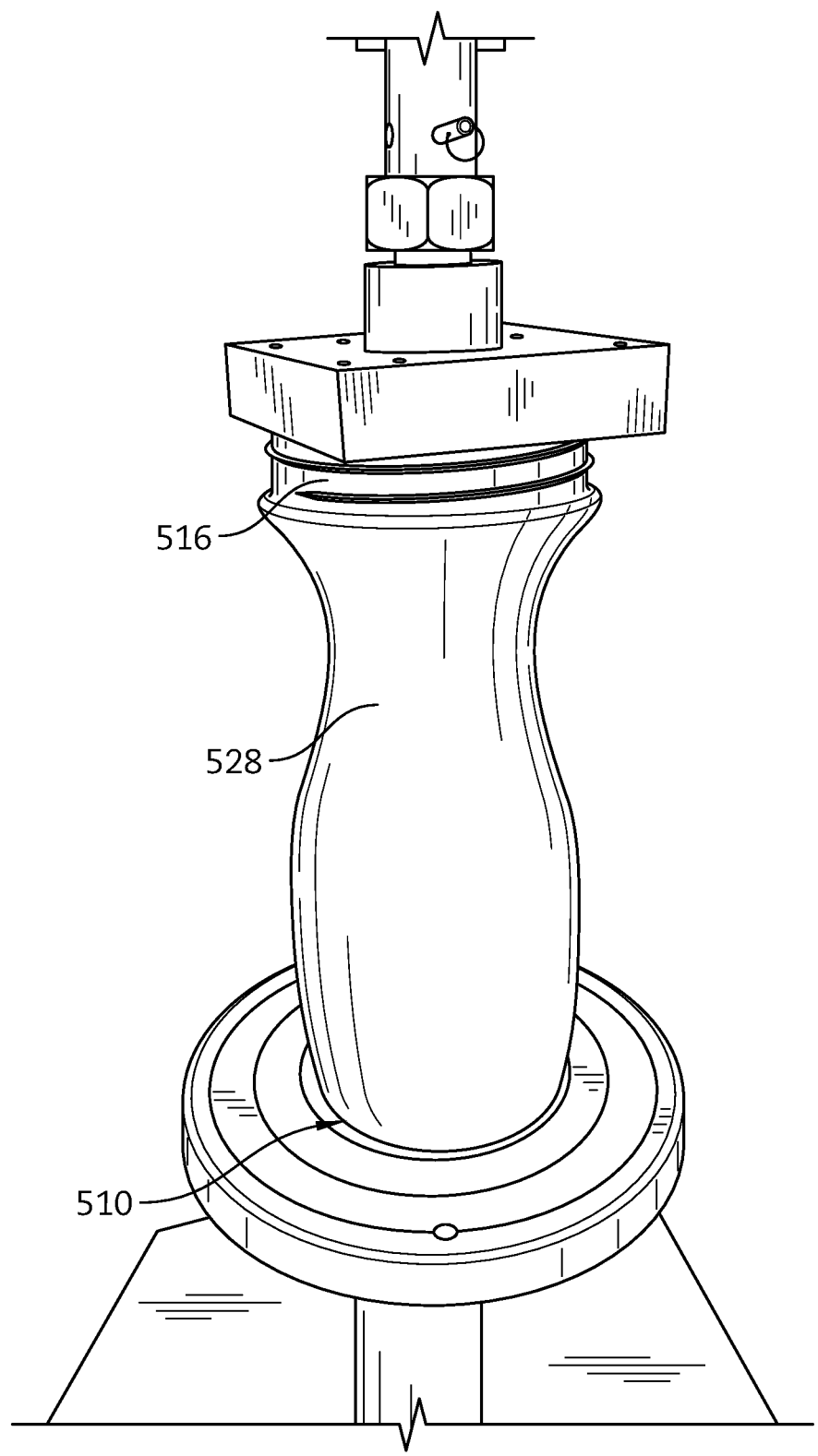
Figure 14A:
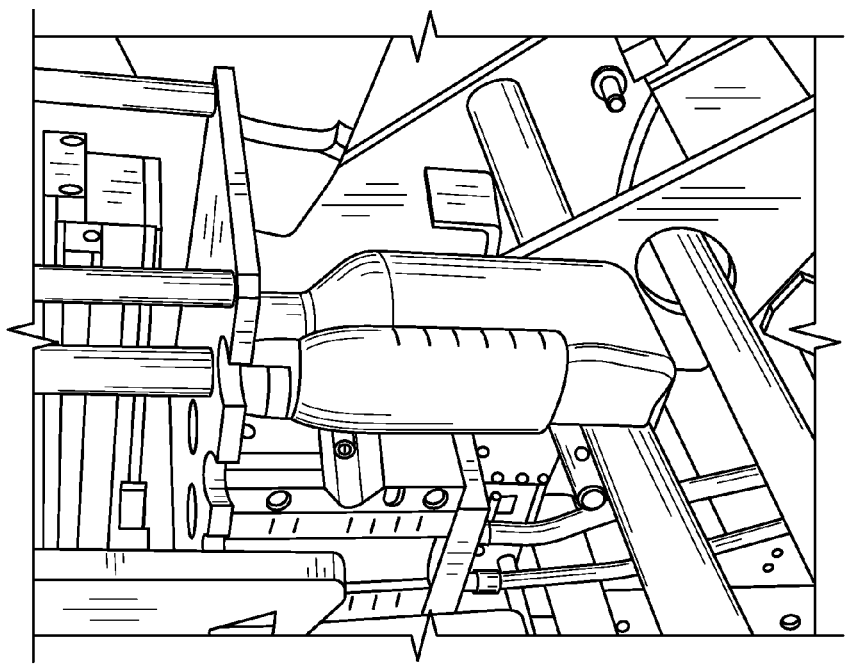
Figure 14B:
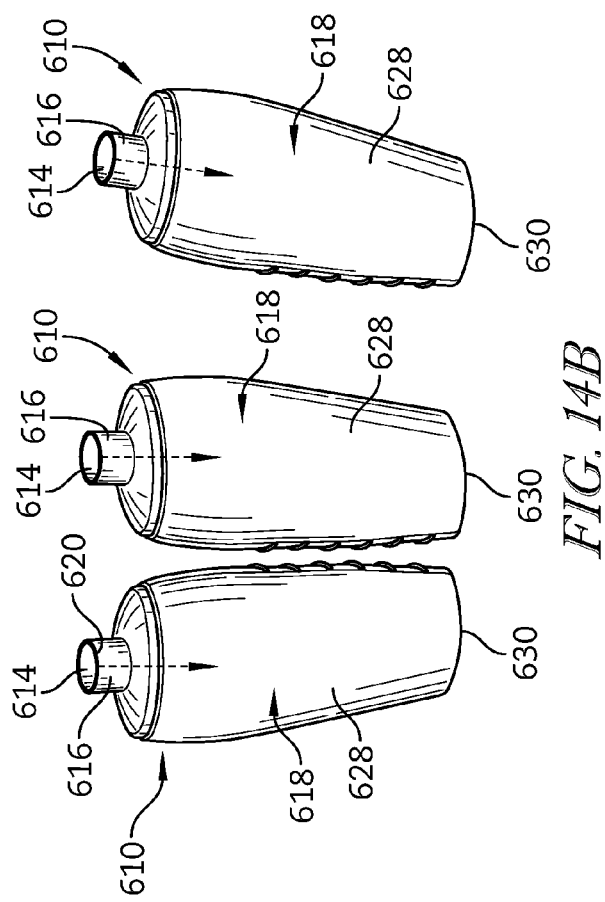
Figure 14C:
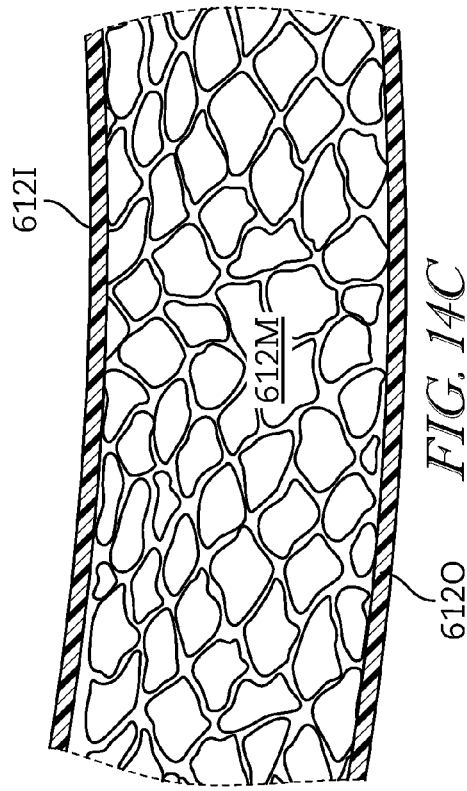
Figure 14E:
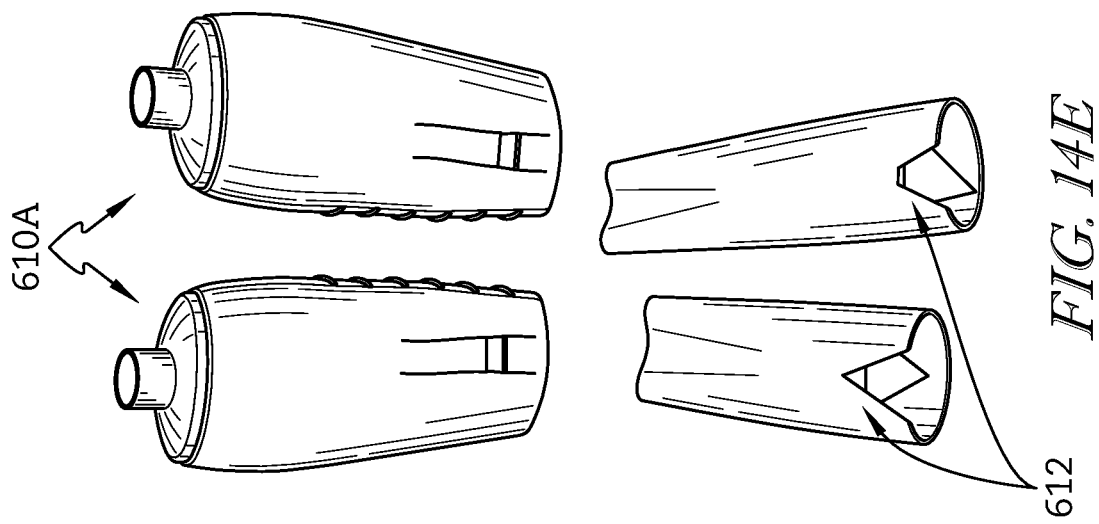
Figure 14D:
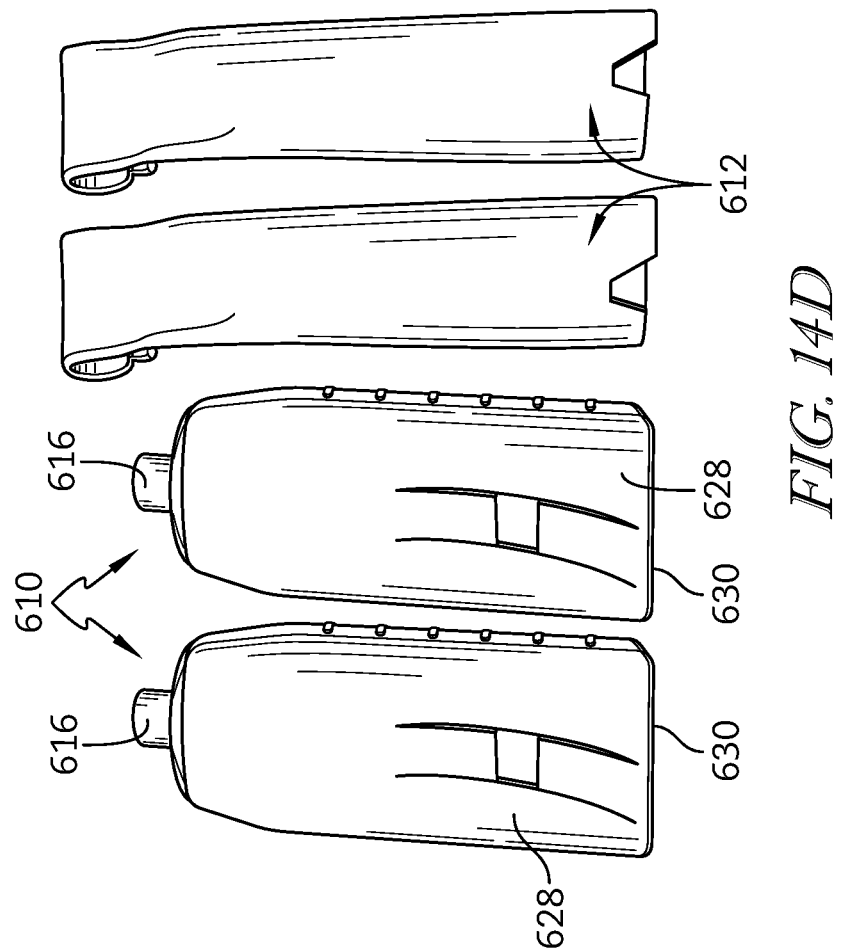
Figure 15:
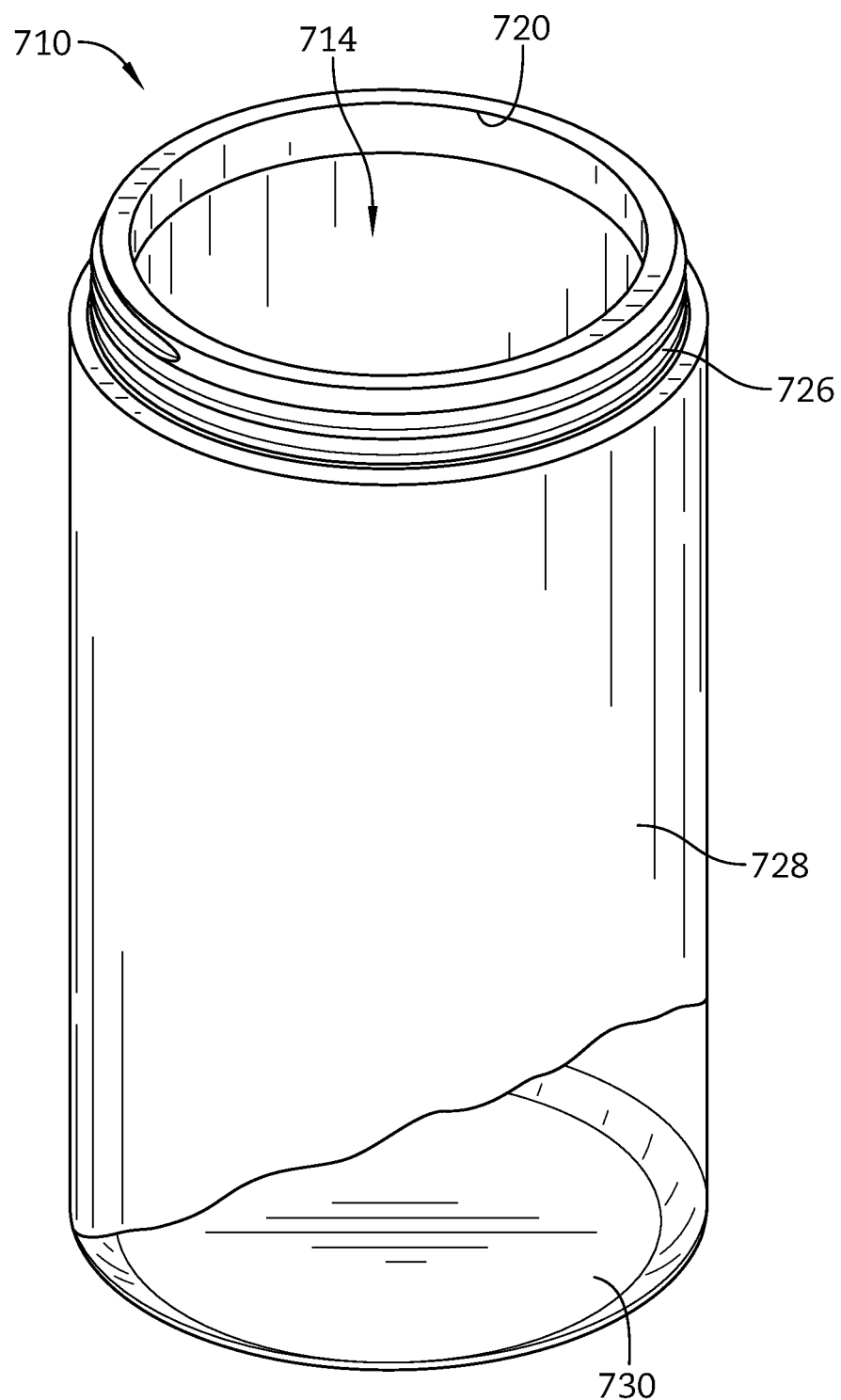
Figure 16:
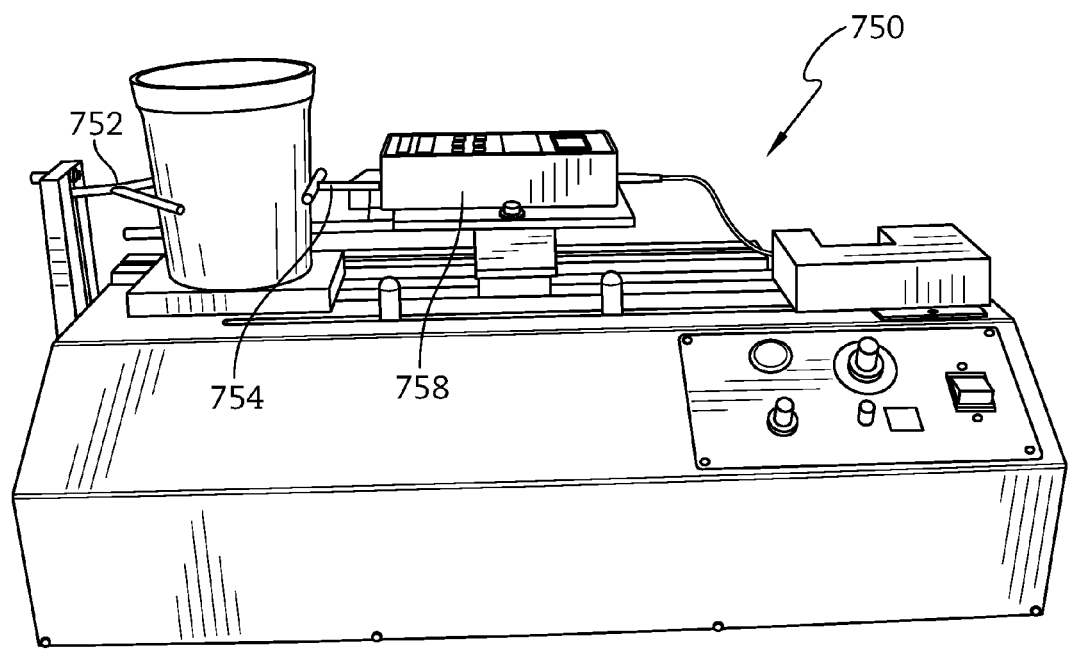
Figure 17:
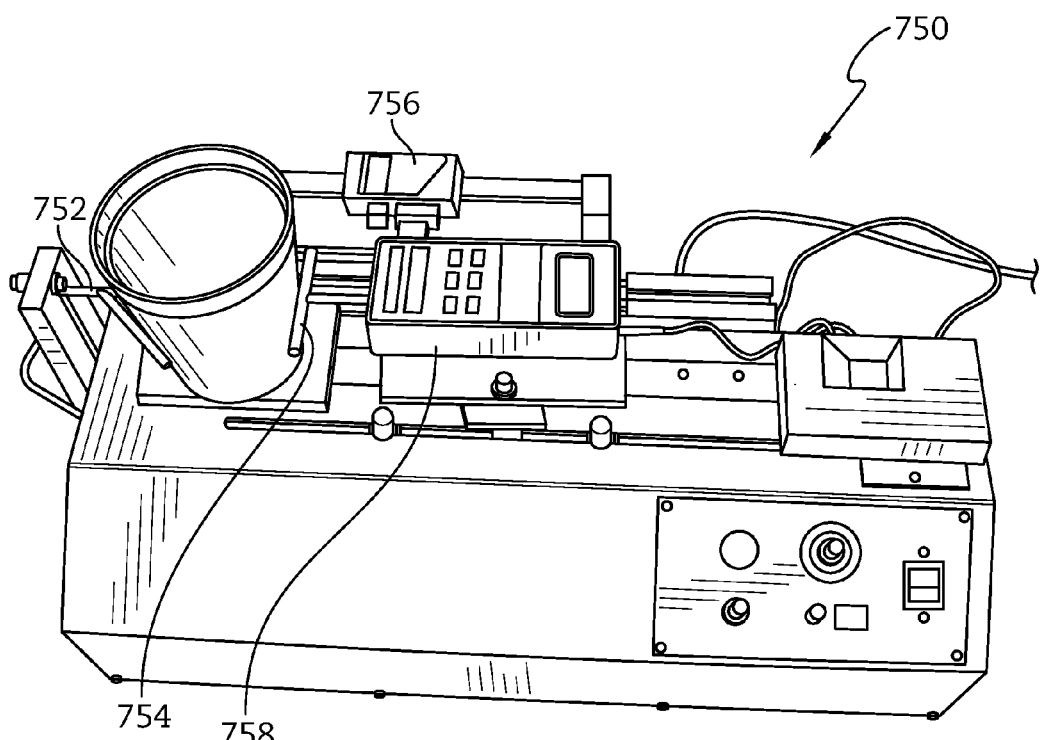
Figure 18:
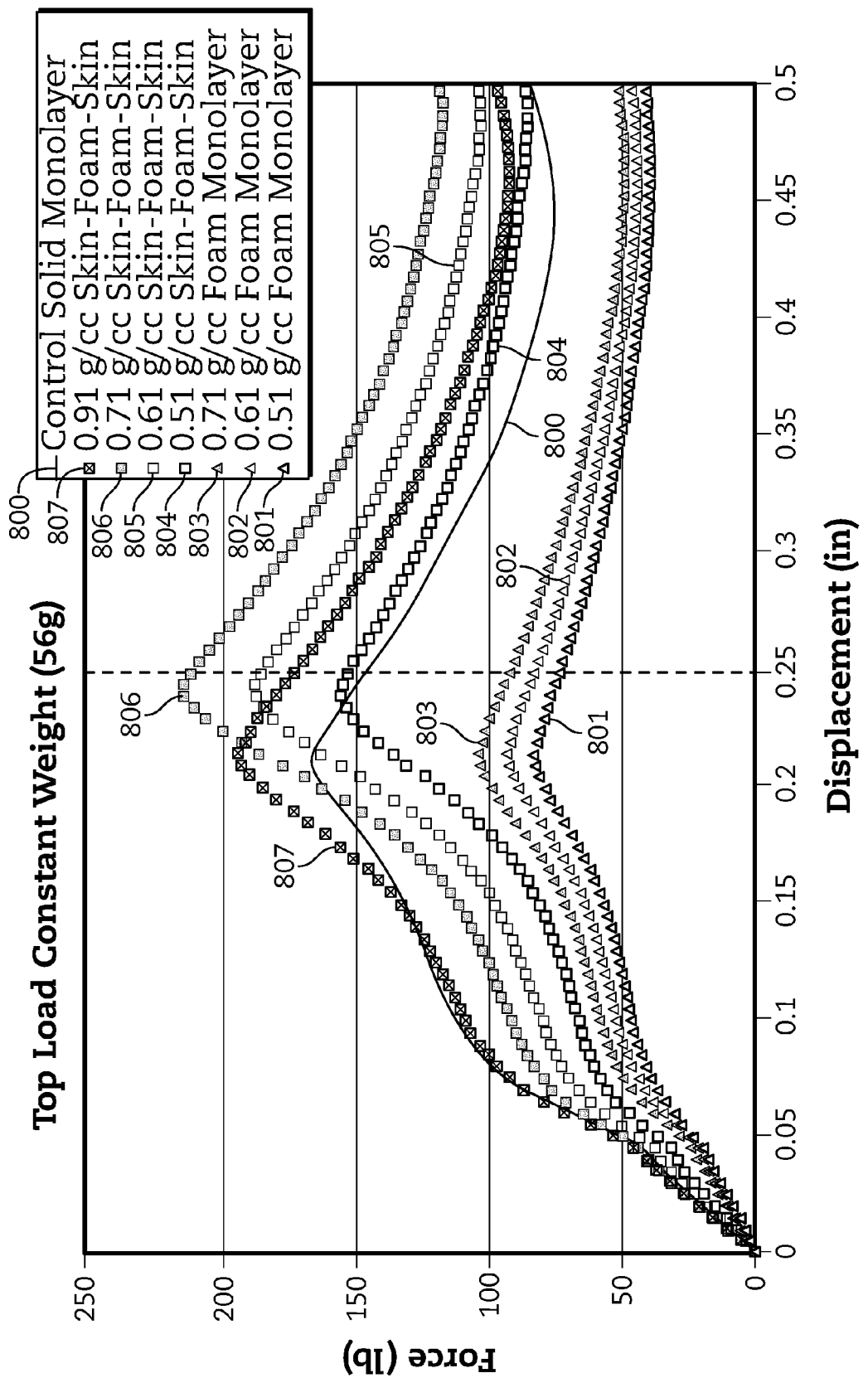
Figure 19:
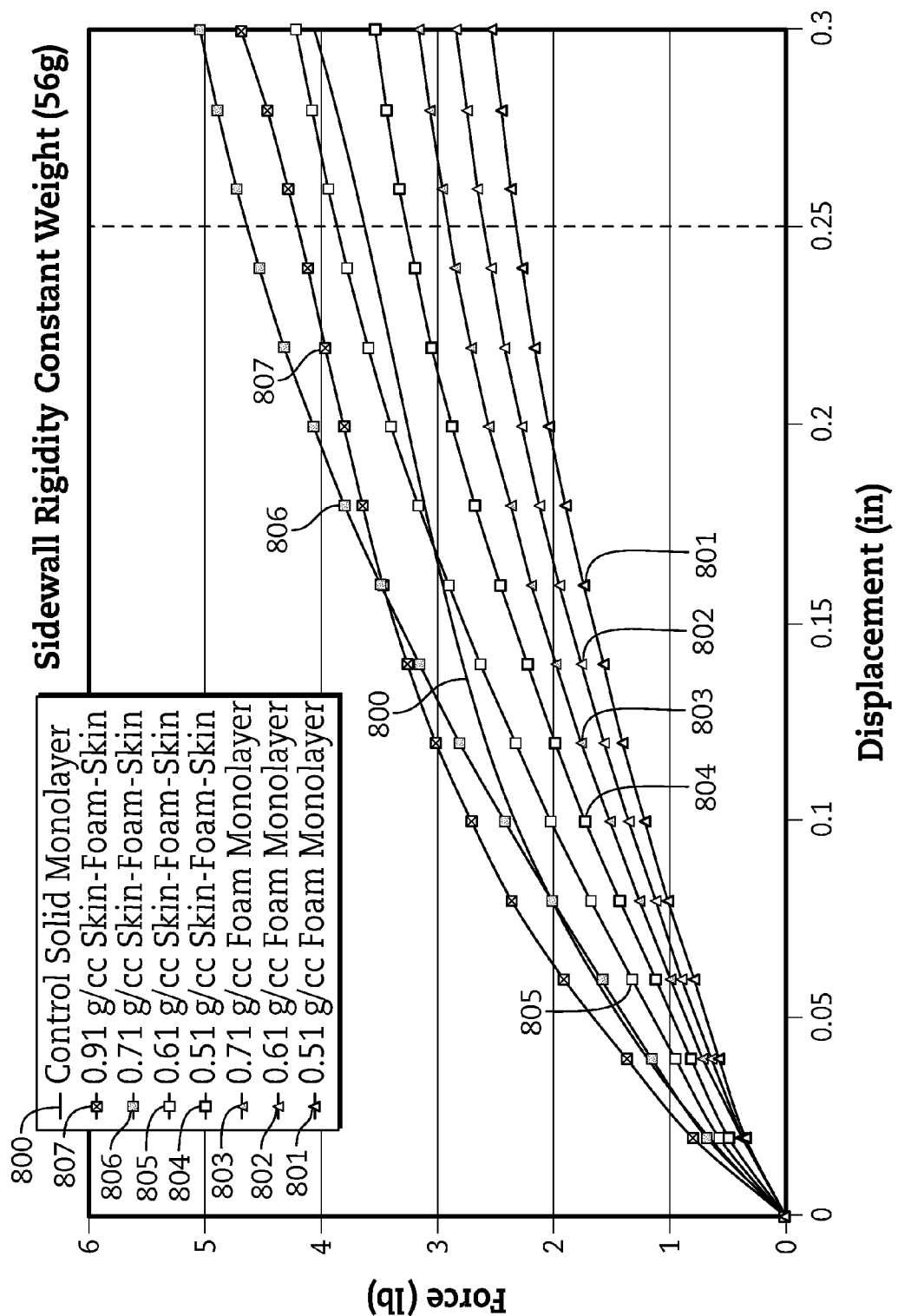
Figure 20:
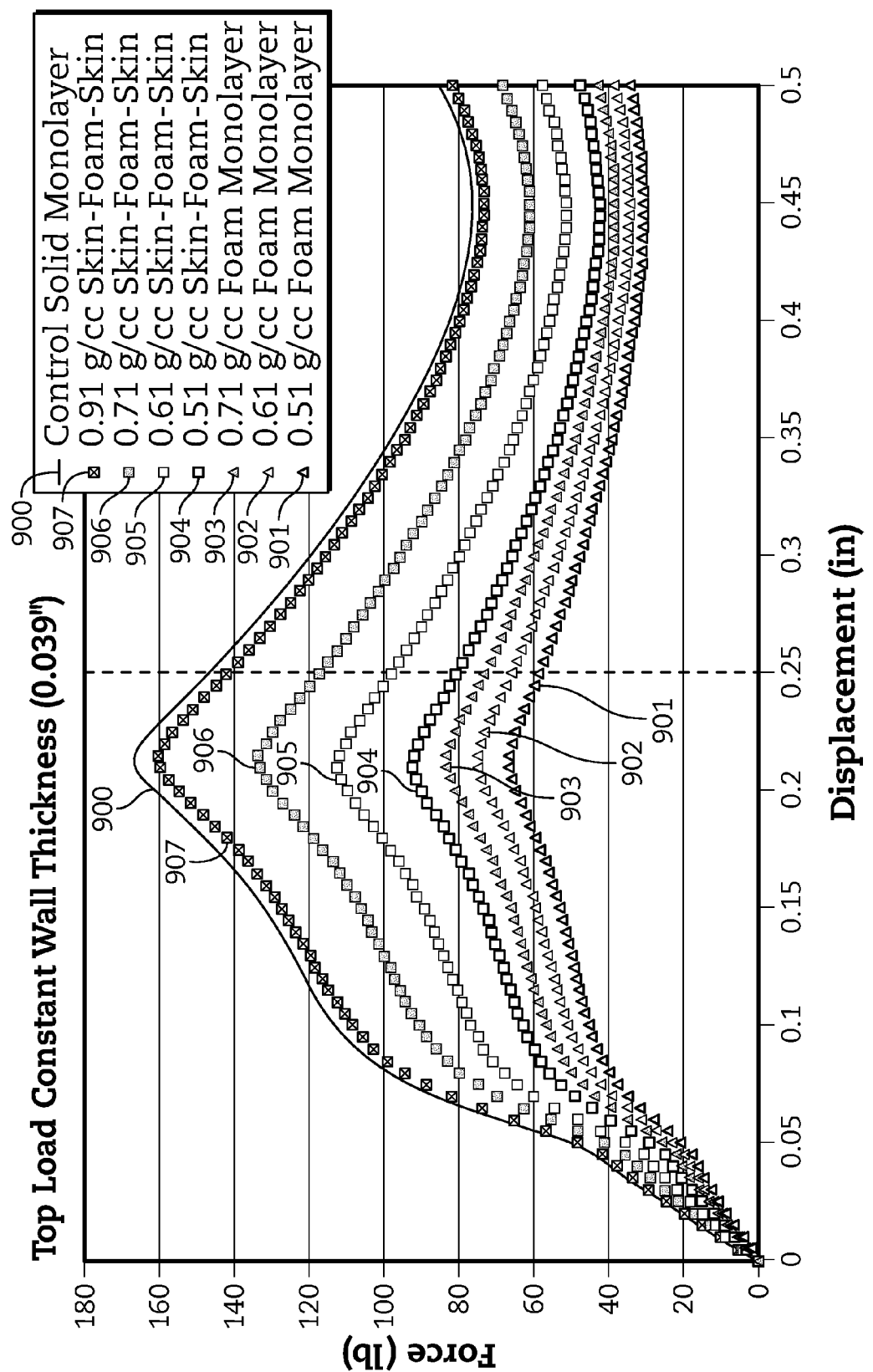
Figure 21:
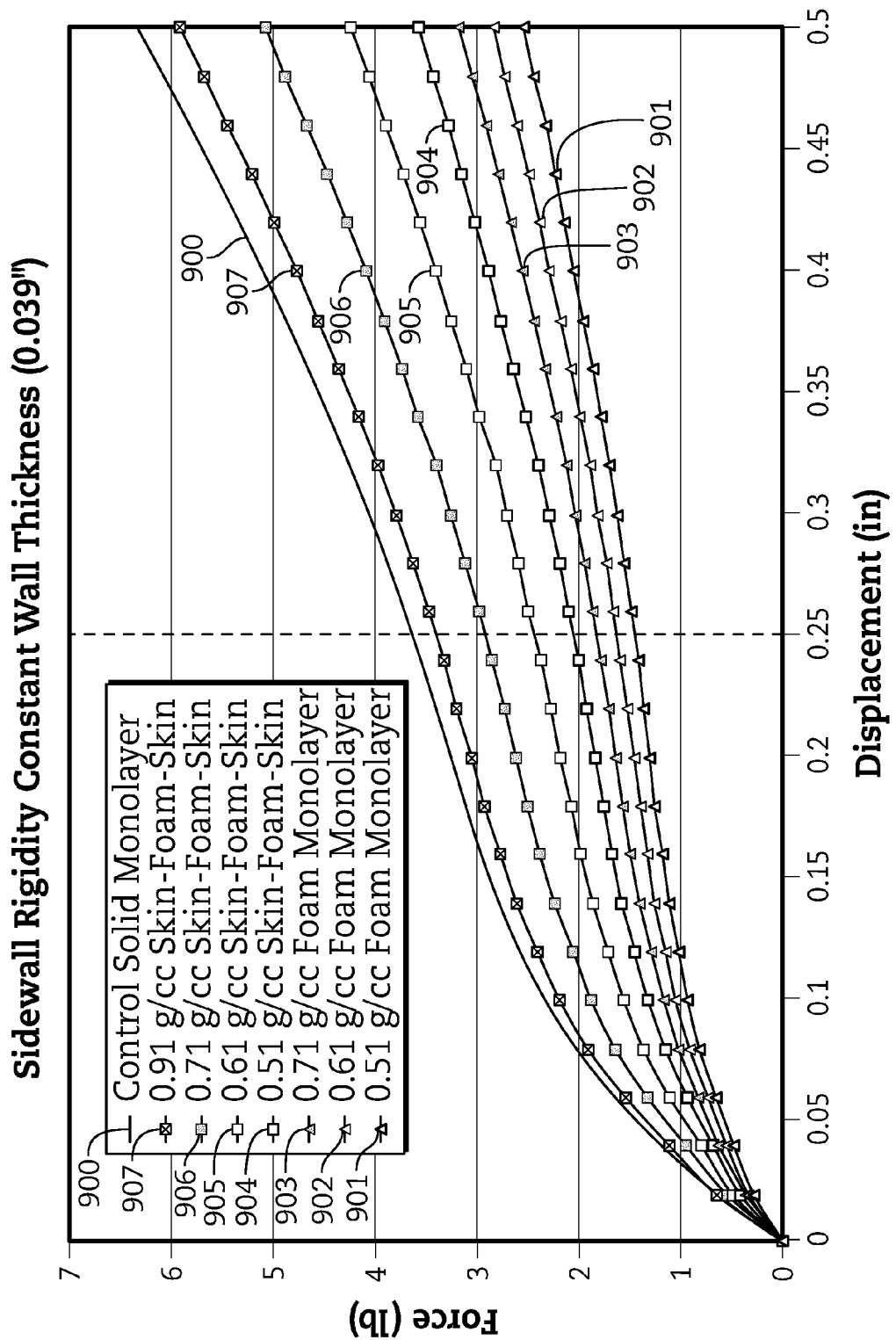
Figure 22:
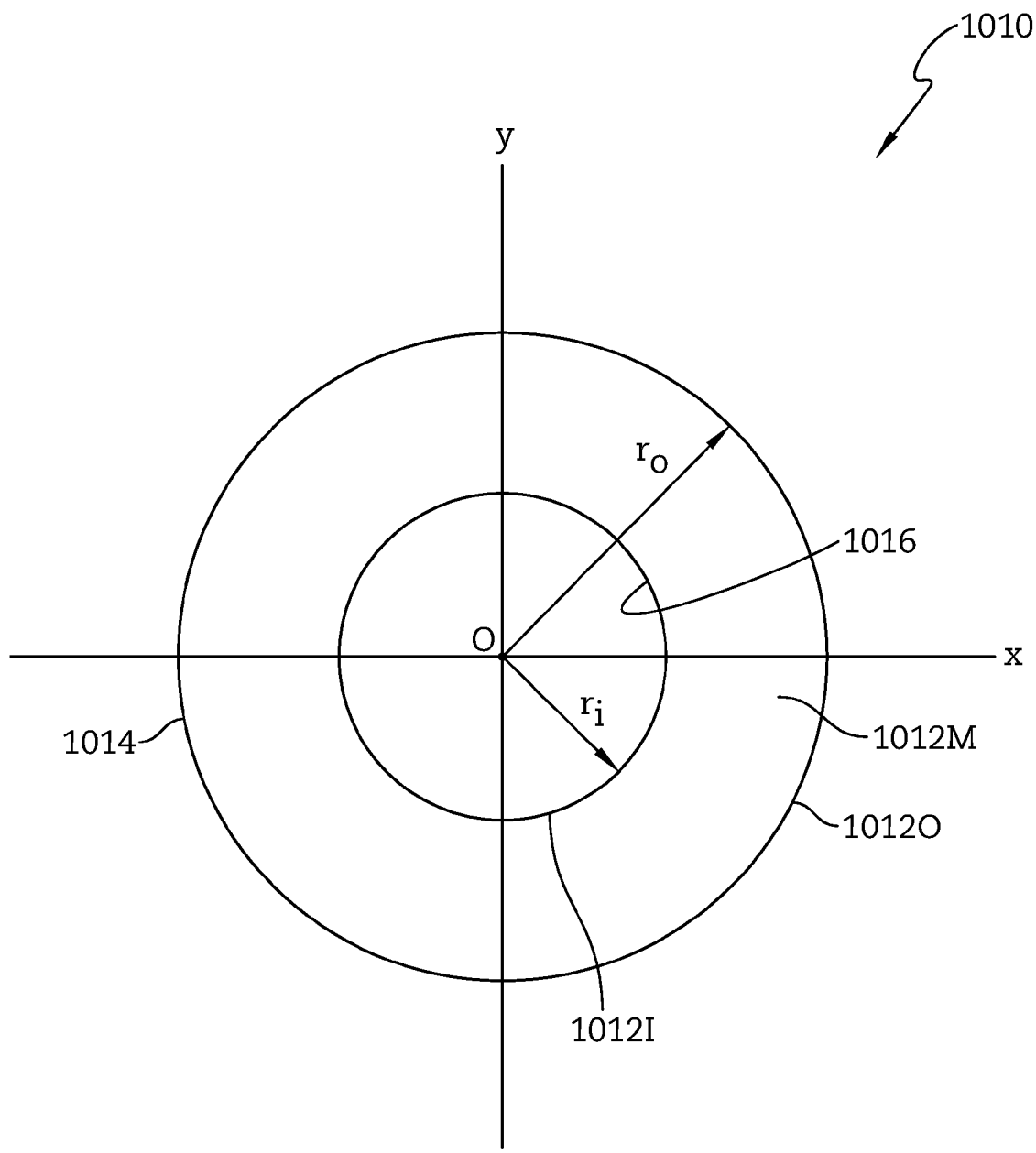

FIG. 4 is a diagrammatic view of the container-manufacturing process of FIGS. 3A-3C showing that the container-manufacturing process includes the operations extruding the inner layer that provides the inner polymeric layer, extruding the middle layer that provides the middle insulative cellular non-aromatic polymeric layer, extruding the outer layer that provides the outer polymeric layer, establishing a pre-form multilayer tube, extruding the pre-form multilayer tube into an open mold cavity, closing the mold, pumping air into the pre-form multilayer tube in the mold cavity to cause the multi-layer tube to expand and take the shape of the mold cavity, opening the mold, removing the vessel from the mold cavity, cutting a top portion off the vessel to establish a body as suggested in FIG. 5, and forming the container of FIG. 1 from the body;

FIG. 5 is a view similar to FIG. 1 showing the body formed during the container-manufacturing process of FIG. 4;

FIG. 6 is a perspective view taken from a bottom of the body showing a floor included in the container;

FIGS. 7A-7D are a series of partial perspective view of a second embodiment of a container-manufacturing process in accordance with the present disclosure showing the formation a body as suggested in FIG. 9 that processed to form a container;

FIG. 7A is a partial perspective view of a portion of the container-manufacturing process showing that the container-manufacturing process begins with extruding an inner layer, a middle layer, and an outer layer to establish a multi-layer tube that is received between two mold halves for forming as suggested in FIG. 7B;

FIG. 7B is a view similar to FIG. 7A showing the two mold halves in a closed position trapping the multilayer tube therebetween in a mold cavity formed by the two mold have when the two mold have are closed;

FIG. 7C is a view similar to FIG. 7B showing the two mold halves in an opened position and a molded vessel being ejected from the mold halves for further processing where a cutting operation removes a top and bottom end of the vessel to establish a side wall;

FIG. 7D is a view similar to FIG. 7C showing the side wall after the cutting operation has been performed and a floor has been coupled to a bottom end of the side wall to establish a body as suggested in FIG. 9;

FIG. 8 is a diagrammatic view of the container-manufacturing process of FIGS. 7A-7D showing that the container-manufacturing process includes the operations extruding the inner layer that provides the inner polymeric layer, extruding the middle layer that provides the middle insulative cellular non-aromatic polymeric layer, extruding the outer layer that provides the outer polymeric layer, establishing a pre-form multilayer tube, extruding the pre-form multilayer tube into an open mold cavity, closing the mold, pumping air into the pre-form multilayer tube in the mold cavity to cause the multi-layer tube to expand and take the shape of the mold cavity, opening the mold, removing the vessel from the mold cavity, cutting top and bottom portions off the vessel to establish the side wall, forming the floor, coupling the floor to the side wall to establish the body, and forming the container as suggested in FIG. 9;

FIG. 9 is a perspective view of a another embodiment of the body formed using the container-manufacturing process of FIGS. 7A-8 with portions broken away to reveal that the container includes the side wall and the floor;

FIG. 10 is a perspective view taken from a bottom of the body of FIG. 9 showing the floor coupled to the side wall of the body;

FIG. 11 is a perspective view of another embodiment of a container in accordance with the present disclosure suggesting that a container including, from top to bottom, a brim, a side wall including a plurality of ribs, and a floor may be formed using the container-manufacturing processes of the present disclosure;

FIG. 12 is a perspective view taken from a bottom of the container of FIG. 11 showing the floor appended to the side wall of the container FIG. 13A is a photograph showing two containers in accordance with another embodiment of the present disclosure;

FIG. 13B is a photograph showing one of the containers of FIG. 13A with a portion of a side wall removed for photographing as suggested in FIG. 13C;

FIG. 13C is an enlarged photograph of a portion of the side wall of FIG. 13B showing that the side wall includes, from top bottom, a inner polymeric layer, a middle insulative cellular non-aromatic polymeric layer, an outer polymeric layer;

FIG. 13D is an enlarged photograph of a portion of the side wall in section showing that the side wall includes, from top to bottom, an outer polymeric layer (outside skin), a middle insulative cellular non-aromatic polymeric layer (foam core), and an inner polymeric layer (inside skin);

FIG. 13E is a photograph showing one of the containers of FIG. 13A coupled to a top-load testing device undergoing top-load testing;

FIG. 14A is a photograph showing another embodiment of a container in accordance with the present disclosure being removed from a mold cavity after air has been pumped into a pre-form multilayer tube in a mold cavity to cause the multi-layer tube to expand and take the shape of the mold cavity;

FIG. 14B is a photograph showing a series of finished containers formed in accordance with the present disclosure;

FIG. 14C is an enlarged photograph showing a section of a side wall included in the containers of FIGS. 14A and 14B showing that the side wall includes, from top bottom, a inner polymeric layer, a middle insulative cellular non-aromatic polymeric layer, and an outer polymeric layer;

FIG. 14D is a photograph showing two containers formed in accordance with the present disclosure and two multi-layer tubes used to form the containers;

FIG. 14E is a photograph showing two containers formed in accordance with the present disclosure and two multi-layer tubes used to form the containers;

FIG. 15 is a perspective view of another embodiment of a container formed in accordance with the present disclosure and subjected to both side-wall rigidity testing as suggested in FIGS. 16 and 17 and top-load testing;

FIG. 16 is a photograph of a side-wall rigidity testing apparatus used to test side-wall rigidity of various containers, the photograph showing an illustrative container located between a stationary Y-bar and a movable T-bar used to deform the side wall of the container;

FIG. 17 is a view similar to FIG. 16 showing that the side-wall rigidity testing apparatus includes a force gauge coupled to the T-bar to measure force applied to the side wall of the container and a travel gauge coupled to the force gauge to measure a distance the side wall has been deformed;

FIG. 18 is a graph showing results of top-load testing for various containers having different densities and different constructions but all the containers having a similar weight of about 56 grams;

FIG. 19 is a graph showing results of sidewall-rigidity testing for various containers having different densities and different constructions but all the containers having a similar weight of about 56 grams;

FIG. 20 is a graph showing results of top-load testing for various containers having different densities and different constructions but all the containers having a similar wall thickness of about 0.039 inches;

FIG. 21 is a graph showing results of sidewall-rigidity testing for various containers having different densities and different constructions but all the containers having a similar wall thickness of about 0.039 inches; and FIG. 22 is a diagrammatic view of another embodiment of a vessel made using a multi-layer tube including an inner polymeric layer, and outer polymeric layer, and a middle insulative cellular non-aromatic polymeric layer therebetween and showing that the vessel has been sectioned through an X-Y plane so as to identify reference radius $r_o$ and $r_i$ which may be used to calculate a moment area of inertia for the vessel.

DETAILED DESCRIPTION

A first embodiment of a container 10 in accordance with the present disclosure is shown in FIG. 1. Container 10 is made from a multi-layer tube 12, also called multi-layer parison 12, as shown in FIGS. 3A-3C and 7A-7C. Multi-layer tube 12 includes an inner polymeric layer 12I, a middle cellular non-aromatic polymeric layer 12M, and an outer polymeric layer 12O as shown in FIG. 2. Container 10 is formed using a first embodiment of a container-manufacturing process 100 as shown, for example, in FIGS. 3A-4. Another embodiment of a body 218 in accordance with the present disclosure is shown, for example in FIGS. 9 and 10. Body 218 is formed during and used in a second embodiment of a container-manufacturing process 300 as shown, for example, in FIGS. 7A-8. Still yet another embodiment of a container 410 formed using one of the container-manufacturing process of the present disclosure is shown, for example, in FIGS. 11 and 12. Another embodiment of a container 510 formed using one of the container-manufac-turing processes of the present disclosure is shown, for example, in FIGS. 13A and 13E. Another embodiment of a container 610 is formed using one of the container-manufacturing processes of the present disclosure is shown, for example, in FIGS. 14B, 14D, and 14E. Still yet another embodiment of a container 710 is formed using the container-manufacturing processes of the present disclosure and is shown in FIG. 15. Container 710 is subjected to both side-wall rigidity testing and top-loading testing in various configurations as show in FIGS. 18-21.

Container 10 is made during container-manufacturing process 100 from multi-layer tube 12 as shown in FIG. 3A-3C. Multi-layer tube 12 includes inner polymeric layer 12I, middle cellular non-aromatic polymeric layer 12M, and outer polymeric layer 12O as shown in FIG. 2. In one example, inner polymeric layer 12I, middle insulative cellular non-aromatic polymeric layer 12M, and outer polymeric layer 12O are made from the same polymeric material or materials. In another example, each of the inner polymeric layer 12I, middle insulative cellular non-aromatic polymeric layer 12M, and outer polymeric layer 12O are made from different materials.

In one example, inner and outer polymeric layers 12I, 12O are made from polypropylene. In another example, inner and outer polymeric layers 12I, 12O are made from high density polyethylene. In still yet another example, one of the polymeric layers may include a polymeric material and an oxygen barrier material such as Ethylene Vinyl Alcohol (EVOH). However, inner and outer polymeric layers 12I, 12 may be made from any suitable polymeric material.

Middle insulative cellular non-aromatic polymeric layer 12M is configured to provide means for insulating a beverage or food placed in an interior region 14 formed in container 10, forming a structure having sufficient mechanical characteristics to support the beverage or food, and providing resistance to deformation and puncture. In one example, middle insulative cellular non-aromatic polymeric layer 12M is made from an insulative cellular non-aromatic high density polyethylene material. In another example, middle insulative cellular non-aromatic polymeric layer 12M is made from a predominantly polypropylene material. Reference is hereby made to U.S. application Ser. No. 13/491,007, filed Jun. 7, 2012 and titled POLYMERIC MATERIAL FOR AN INSULATED CONTAINER and to U.S. application Ser. No. 14/063,252, filed May 1, 2014 and titled POLYMERIC MATERIAL FOR AN INSULATED CONTAINER, for disclosure relating to a formulation used to make polypropylene based insulative cellular non-aromatic polymeric material, which application is hereby incorporated in its entirety herein.

In one exemplary embodiment, a formulation used to produce the cellular polymeric material includes at least one polymeric material. The polymeric material may include one or more base resins. In one example, the base resin is polypropylene. In an illustrative embodiment, a base resin can include *Borealis* WB140 HMS polypropylene homopolymer. In another illustrative embodiment, a base resin can include Braskem F020HC polypropylene homopolymer. In an embodiment, a base resin can include both *Borealis* WB140 HMS polypropylene homopolymer and Braskem F020HC polypropylene homopolymer.

In embodiments with more than one polypropylene copolymer base resin, different polypropylene copolymers can be used depending on the attributes desired in the formulation. Depending on the desired characteristics, the ratio of two polypropylene resins may be varied, e.g., 10%/90%, 20%/80%, 25%/75%, 30%/70%, 35%/65%, 40%/60%, 45%/55%, 50%/50%, etc. In an embodiment, a formulation includes three polypropylene resins in the base resin. Again, depending on the desired characteristics, the percentage of three polypropylene resins can be varied, 33%/33%/33%, 30%/30%/40%, 25%/25%/50%, etc.

In illustrative embodiments, a polymeric material includes a primary base resin. In illustrative embodiments, a base resin may polypropylene. In illustrative embodiments, an insulative cellular non-aromatic polymeric material comprises a polypropylene base resin having a high melt strength, a polypropylene copolymer or homopolymer (or both). In an embodiment, a formulation of the polymeric material comprises about 50 wt % to about 100 wt %, about 70 wt % to about 100 wt %, about 50 wt % to about 99 wt %, 50 wt % to about 95 wt %, about 50 wt % to about 85 wt %, about 55 wt % to about 85 wt %, about 80 wt % to about 85 wt %, about 80 wt % to about 90 wt %, about 80 wt % to about 91 wt %, about 80 wt % to about 92 wt %, about 80 wt % to about 93 wt %, about 80 wt % to about 94 wt %, about 80 wt % to about 95 wt %, about 80 wt % to about 96 wt %, about 80 wt % to about 97 wt %, about 80 wt % to about 98 wt %, about 80 wt % to about 99 wt %, about 85 wt % to about 90 wt %, or about 85 wt % to about 95 wt % of the primary base resin. In an embodiment, a colorant can be about 80%, 81%, 82%, 83%, 84%, 85%, 86%, 87%, 88%, 89%, 90%, 91%, 92%, 93%, 94%, 95%, 96%, 97%, 98%, 99%, or 100%.

As defined hereinbefore, any suitable primary base resin may be used. One illustrative example of a suitable polypropylene base resin is DAPLOY™ WB140 homopolymer (available from *Borealis* A/S) which is a high melt strength structural isomeric modified polypropylene homopolymer.

In illustrative embodiments, a polymeric material includes a secondary resin, wherein the secondary resin can be a polypropylene copolymer or homopolymer (or both). In another embodiment, a secondary resin can be about 0 wt % to about 50 wt %, about 0 wt % to about 30 wt %, about 0 wt % to about 25 wt %, about 0 wt % to about 20 wt %, about 0 wt % to about 15 wt %, about 10 wt % to about 50 wt %, about 10 wt % to about 40 wt %, about 10 wt % to about 30 wt %, about 10 wt % to about 25 wt %, about 10 wt % to about 20 wt %, or about 10 wt % to about 15 wt % of a secondary resin. In an embodiment, a polymeric material includes about 0 wt %, about 10 wt %, about 15 wt %, about 20 wt %, about 25 wt %, or about 30 wt %. In an embodiment, a polymeric material does not have a secondary resin. In a particular embodiment, a secondary resin can be a high crystalline polypropylene homopolymer, such as F020HC (available from Braskem) or PP 527K (available from Sabic). In an embodiment, a polymeric material lacks a secondary resin.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clamant Corporation), which contains citric acid and a crystal nucleating agent.

A "blowing agent" refers to a physical or a chemical blowing agent (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clamant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide; and combinations thereof.

In an illustrative embodiment, a nucleating agent can be about 0.1% to about 20% (w/w), about 0.25% to about 20%, about 0.5% to about 20%, about 0.75% to about 20%, about 1% to about 20%, about 1.5% to about 20%, about 2% to about 20%, about 2.5% to about 20%, about 3% to about 20%, about 3% to about 20%, about 4% to about 20%, about 4.5% to about 20%, about 5% to about 20%, about 0.1% to about 10%, about 0.25% to about 10%, about 0.5% to about 10%, about 0.75% to about 10%, about 1.0% to about 10%, about 1.5% to about 10%, about 1.0% to about 10%, about 2.0% to about 10%, about 2.5% to about 10%, about 3.0% to about 10%, about 3.5% to about 10%, about 4.0% to about 10%, about 4.5% to about 10%, about 5.0% to about 10%, about 0.1% to about 5%, about 0.25% to about 5%, about 0.5% to about 5%, about 0.75% to about 5%, about 1% to about 5%, about 1.5% to about 5%, about 1% to about 5%, about 2% to about 5%, about 2.5% to about 5%, about 3% to about 5%, about 3.5% to about 5%, or about 4% to about 5%, or about 4.5% to about 5%. In an embodiment, a nucleating agent can be about 0.5%, about 1%, about 1.5%, about 2%, about 2.5%, about 3%, about 4%, or about 5% (w/w). In an embodiment, the polymeric material lacks a nucleating agent. In an embodiment, the polymeric material lacks talc.

In an illustrative embodiment, a chemical blowing agent can be 0 to about 5% (w/w), about 0.1% to about 5% (w/w), about 0.25% to about 5%, about 0.5% to about 5%, about 0.75% to about 5%, about 1% to about 5%, about 1.5% to about 5%, about 2% to about 5%, about 3% to about 5%, about 4% to about 5%, 0 to about 4% (w/w), about 0.1% to about 4% (w/w), about 0.25% to about 4%, about 0.5% to about 4%, about 0.75% to about 4%, about 1% to about 4%, about 1.5% to about 4%, about 2% to about 4%, about 3% to about 4%, 0 to about 3% (w/w), about 0.1% to about 3% (w/w), about 0.25% to about 3%, about 0.5% to about 3%, about 0.75% to about 3%, about 1% to about 3%, about 1.5% to about 3%, about 2% to about 3%, 0 to about 2%, about 0.1% to about 2% (w/w), about 0.25% to about 2%, about 0.5% to about 2%, about 0.75% to about 2%, about 1% to about 2%, about 1.5% to about 2%, 0 to about 1%, about 0.1% to about 1%, about 0.5% to about 1%, or about 0.75% to about 1%. In an illustrative embodiment, a chemical blowing agent can be about 0.1%, 0.5%, 0.75%, 1%, 1.5% or about 2%. In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

In an embodiment, a slip agent can be about 0% to about 10% (w/w), about 0.5% to about 10% (w/w), about 1% to about 10% (w/w), about 2% to about 10% (w/w), about 3% to about 10% (w/w), about 4% to about 10% (w/w), about 5% to about 10% (w/w), about 6% to about 10% (w/w), about 7% to about 10% (w/w), about 8% to about 10% (w/w), about 9% to about 10% (w/w), about 0% to about 9% (w/w), about 0.5% to about 9% (w/w), about 1% to about 9% (w/w), about 2% to about 9% (w/w), about 3% to about 9% (w/w), about 4% to about 9% (w/w), about 5% to about 9% (w/w), about 6% to about 9% (w/w), about 7% to about 9% (w/w), about 8% to about 9% (w/w), about 0% to about 8% (w/w), about 0.5% to about 8% (w/w), about 1% to about 8% (w/w), about 2% to about 8% (w/w), about 3% to about 8% (w/w), about 4% to about 8% (w/w), about 5% to about 8% (w/w), about 6% to about 8% (w/w), about 7% to about 8% (w/w), about 0% to about 7% (w/w), about 0.5% to about 7% (w/w), about 1% to about 7% (w/w), about 2% to about 7% (w/w), about 3% to about 7% (w/w), about 4% to about 7% (w/w), about 5% to about 7% (w/w), about 6% to about 7% (w/w), about 0% to about 6% (w/w), about 0.5% to about 6% (w/w), about 1% to about 6% (w/w), about 2% to about 6% (w/w), about 3% to about 6% (w/w), about 4% to about 6% (w/w), about 5% to about 6% (w/w), about 0% to about 5% (w/w), about 0.5% to about 5% (w/w), about 1% to about 5% (w/w), about 2% to about 5% (w/w), about 3% to about 5% (w/w), about 4% to about 5% (w/w), about 0% to about 4% (w/w), about 0.5% to about 4% (w/w), about 1% to about 4% (w/w), about 2% to about 4% (w/w), about 3% to about 4% (w/w), about 0% to about 3% (w/w), about 0.5% to about 3% (w/w), about 1% to about 3% (w/w), about 2% to about 3% (w/w), about 0% to about 2% (w/w), about 0.5% to about 2% (w/w), about 1% to about 2% (w/w), about 0% to about 1% (w/w), or about 0.5% to about 1% (w/w). In an embodiment, a slip agent can be about 0.5%, about 1%, about 2%, about 3%, about 4%, about 5%, about 6%, about 7%, about 8%, about 9%, or about 10% (w/w). In an embodiment, the formulation lacks a slip agent.

In an embodiment, a colorant can be about 0% to about 20% (w/w), about 0% to about 15% (w/w), about 0% to about 10% (w/w), about 0% to about 5% (w/w), about 0% to about 4% (w/w), about 0.1% to about 4%, about 0.25% to about 4%, about 0.5% to about 4%, about 0.75% to about 4%, about 1.0% to about 4%, about 1.5% to about 4%, about 2.0% to about 4%, about 2.5% to about 4%, about 3% to about 4%, about 0% to about 3.0%, about 0% to about 2.5%, about 0% to about 2.25%, about 0% to about 2.0%, about 0% to about 1.5%, about 0% to about 1.0%, about 0% to about 0.5%, about 0.1% to about 3.5%, about 0.1% to about 3.0%, about 0.1% to about 2.5%, about 0.1% to about 2.0%, about 0.1% to about 1.5%, about 0.1% to about 1.0%, about 1% to about 5%, about 1% to about 10%, about 1% to about 15%, about 1% to about 20%, or about 0.1% to about 0.5%. In an embodiment, a formulation lacks a colorant.

In an embodiment, the formulation comprises:
50-100 wt % of a primary base resin
0-50 wt % of a secondary resin
0-5 wt % of a chemical blowing agent
0.1-20 wt % of a nucleating agent
0-20 wt % of a colorant
0-10 wt % of a slip agent In another embodiment, the formulation comprises:
50-100 wt % of a primary base resin
0-50 wt % of a secondary resin
0-2 wt % of a chemical blowing agent
0-20 wt % of a physical nucleating agent
0-20 wt % of a colorant
0-10 wt % of a slip agent In another embodiment, the formulation comprises:
75-85 wt % of a primary base resin
10-20 wt % of a secondary resin
0-0.1 wt % of a chemical blowing agent
0.1-3 wt % of a nucleating agent
0-2 wt % of a colorant
0-4 wt % of a slip agent In another embodiment, the formulation comprises:
50-99.65 wt % of the primary base resin
0-50 wt % of the secondary resin
0-10 wt % of the slip agent
0-10 wt % of the colorant
0.35-1.5 wt % of nucleating agent In another embodiment, the formulation comprises:
50-95 wt % of the primary base resin
0-50 wt % of the secondary resin
0-10 wt % of the slip agent
0-10 wt % of the colorant
0.4-1.2 wt % of nucleating agent In another embodiment, the formulation comprises:
55-85 wt % of the primary base resin
0-50 wt % of the secondary resin
0-10 wt % of the slip agent
0-10 wt % of the colorant
0.45-1.25 wt % of nucleating agent In another embodiment, the formulation comprises:
50-99.69 wt % of the primary base resin
0-50 wt % of the secondary resin
0-10 wt % of the slip agent
0-10 wt % of the colorant
0.01-1.5 wt % of the primary nucleating agent
0.3-1.7 wt % of the secondary nucleating agent In another embodiment, the formulation comprises:
50-95 wt % of the primary base resin
0-50 wt % of the secondary resin
0-10 wt % of the slip agent
0-10 wt % of the colorant
0.02-1.0 wt % of the primary nucleating agent
0.4-1.5 wt % of the secondary nucleating agent In another embodiment, the formulation comprises:
55-85 wt % of the primary base resin
0-50 wt % of the secondary resin
0-10 wt % of the slip agent
0-10 wt % of the colorant
0.03-0.7 wt % of the primary nucleating agent
0.45-1.25 wt % of the secondary nucleating agent In another embodiment, the formulation comprises:
78-83 wt % of a primary base resin
14-16 wt % of a secondary resin
0-0.05 wt % of a chemical blowing agent
0.25-2 wt % of a nucleating agent
1-2 wt % of a colorant
1.5-3.5 wt % of a slip agent In the preceding embodiments, the primary base resin may comprise a polypropylene. Suitably, the primary base resin comprises at least one of *Borealis* WB140 HMS polypropylene homopolymer and Braskem F020HC polypropylene homopolymer. More suitably, the primary base resin is *Borealis* WB140 HMS polypropylene homopolymer.

In the preceding embodiments, the secondary resin may comprise at least one polypropylene copolymer or polypropylene homopolymer. Suitably, the secondary resin comprises at least one of Braskem F020HC polypropylene homopolymer and PP 527K (available from Sabic). More suitably, the secondary resin is Braskem F020HC polypropylene homopolymer.

In the preceding embodiments, the chemical blowing agent may comprise citric acid, or a citric acid-based material. Suitably the chemical blowing agent is Hydrocerol™ CF-40E (available from Clamant Corporation).

In the preceding embodiments, the nucleating agent may comprise talc, $CaCO_3$, mica and mixtures thereof. Suitably, the nucleating agent is one or more of HT4HP talc (available from Heritage Plastics) and HT6000 Linear Low Density Polyethylene (LLDPE) (available from Heritage Plastics) and Techmer PM PPM 16466 Silica. More suitably, the nucleating agent is HT4HP talc (available from Heritage Plastics) or Techmer PM PPM 16466 Silica. A primary nucleating agent may be defined as a chemical blowing agent or chemical foaming agent, itself comprising a nucleating agent. In a particular embodiment, a primary nucleating agent is Hydrocerol™ CF-40E™ (available from Clamant Corporation). In a particular embodiment, a secondary nucleating agent is selected from HPR-803i fibers (available from Milliken) or talc In the preceding embodiments, the colorant may comprise at least one of Colortech 11933-19 $TiO_2$ PP and Cell Stabilizer. Suitably, the colorant is Colortech 11933-19 $TiO_2$ PP.

In the preceding embodiments, the slip agent may comprise one or more amides of fats or fatty acids, such as erucamide and oleamide. The slip agent may also comprise one or more low molecular weight amides and fluoroelastomers. Suitably, the slip agent is Ampacet 102823 Process Aid PE MB LLDPE.

The method of any of the preceding embodiments may also comprise adding $CO_2$ to the formulation prior to extrusion at a rate of 1-4 lbs/hr. In one example, the $CO_2$ is added at a rate of 2-3 lbs/hr. In another example, the $CO_2$ is added at a rate of 2.2-2.8 lbs/hr. Such practice may also be referred to as adding a physical blowing agent.

In illustrative embodiments, the middle cellular non-aromatic polymeric layer 12M has a density in a range of about $0.01 \text{ g/cm}^3$ to about $0.19 \text{ g/cm}^3$. In illustrative embodiments, the middle cellular non-aromatic polymeric layer has a density in a range of about $0.05 \text{ g/cm}^3$ to about $0.19 \text{ g/cm}^3$. In illustrative embodiments, the middle cellular non-aromatic polymeric layer has a density in a range of about $0.1 \text{ g/cm}^3$ to about $0.185 \text{ g/cm}^3$.

Outer polymeric layer 12O and inner polymeric layer 12I are, for example, made a non-aromatic polymer. Inner polymeric layer 12I is spaced apart from outer polymeric layer 12O so as to locate middle insulative cellular non-aromatic polymeric layer 12M therebetween. Inner polymer layer 12I is located between interior region 14 and middle insulative cellular non-aromatic polymeric layer 12M as shown, for example, in FIG. 2.

In one illustrative example, outer and inner polymeric layers 12O, 12I are made from polypropylene. While inner and outer polymeric layers 12O, 12I may be made from the same material, they may also be made from different materials so as to achieve desired performance characteristics of the container.

Container 10 includes, from top to bottom, a brim 16 and a body 18 as shown in FIG. 1. Brim 16 is appended to a top portion of body 18 and arranged to define a mouth 20 opening into interior region 14 formed in body 18. In one example, container 10 is an insulative drink cup and brim 16 is adapted to mate with a lid which covers and closes mouth 20.

Container 10 is formed using container-manufacturing process 100 as shown, for example in FIGS. 3A-4. Container-manufacturing process 100 is, for example, a multi-layer co-extruded blow molding operation as suggested in FIGS. 3A and 4. Container-manufacturing process 100 includes an inner layer extrusion operation 102, a middle layer extrusion operation 104, an outer layer extrusion operation 106, and a tube forming operation 108 as shown in FIGS. 3A and 4. Inner layer extrusion operation 102 occurs when a first extruder 131 extrudes an inner layer 142 which provides inner polymeric layer 12I. Middle layer extrusion operation 104 occurs when a second extruder 132 extrudes a middle layer 142 which provides middle cellular non-aromatic polymeric layer 12M. Outer layer extrusion operation 106 occurs when a third extruder 133 extrudes an outer layer 143 which provides outer polymeric layer 12O. All three layers 141, 142, 143 are brought together in order during tube forming operation 108 in a die 140 to establish multi-layer tube 12 as shown in FIG. 3A.

While container-manufacturing process 100 shows the extrusion of three layers, any number of inner layers, middle layers, and outer layers may be extruded by any number of extrudes. These various layers may then be combined in the die to establish a multi-layer tube.

Container-manufacturing process 100 further includes an extruding multi-layer tube operation 110, a mold closing operation 112, an air pumping operation 114, a mold opening operation 116, and a vessel removing operation 118 as shown, for example, in FIGS. 3B-4. During extruding multi-layer tube operation 110, extruders 131, 132, 133 continue to extrude associated layers 141, 142, 143 so that multi-layer tube 12 is extruded between two mold halves 134A, 134B included in a mold 134 as shown in FIG. 3A. During mold closing operation 112, mold halves 134A, 134B are brought together to establish a mold cavity 134C formed in mold 134. Next, air is pumped into a portion of multi-layer tube 12 trapped in mold cavity 134C to cause multi-layer tube 12 to expand and take on a shape of mold cavity 134C and establish a vessel 22 including an interior space 24 filled with air. However, in another example vacuum may be applied to the multi-layer tube 12 in mold cavity 134 to take on the shape of mold cavity 134. During mold opening operation 116, mold halves 134A, 134B open and move away from one anther as shown in FIG. 3C. Vessel 22 is removed from mold 134.

In one example, a continuous extrusion process may be used in combination with a rotary blow molding machine. In this example, a continuous multi-layer tube is extruded and a series of molds included in the rotary blow molding machine rotate relative to the multi-layer tube. As molds approach the extruders forming the multi-layer tube, they begin to move from an opened arrangement to a closed arrangement trapping a portion of the multi-layer tube in a mold cavity formed in the mold. As the molds move away from the extruders forming the multi-layer tube, they move from the closed position to an opened position where a vessel is ejected from the mold cavity. One example of a rotary extrusion blow molding machine is available from Wilmington Machinery of Wilmington, N.C.

In another example, a continuous extrusion process may be used in combination with a shuttle blow molding machine. In this example, a first mold on a track moves to an opened position, slides over to receive the multi-layer tube in the mold cavity, and moves to a closed position. The first mold then slides away from the multi-layer tube where air is pumped into the interior space to cause the multi-layer tube to assume the mold shape. When the first mold moves away from the multi-layer tube, a second mold moves to an opened position, slides over to receive the continuously extruded multi-layer tube in a mold cavity of the second mold, and moves to a closed position. The second mold then slides away from the multi-layer tube where air is pumped into the interior space. While the second mold moves away from the multi-layer tube, the first mold moves to the opened position ejecting the vessel to start the process over again.

One example of a shuttle blow molding machine is available from Graham Engineering Corporation of York, Pa.

Container-manufacturing process 100 may include an optional step of inserting a label or other item in the mold cavity prior to receiving the multi-layer tube 12 therein. As a result, body 18 may be formed with a printed label or other feature coupled to the side wall 28 during molding. Thus, container-manufacturing process 100 is capable of an-mold labeling operation.

Container-manufacturing process 100 further includes a cutting operation 120 and a forming operation 122 as shown in FIG. 4. During cutting operation 120, a top portion 26 of vessel 22 is cut and separated from vessel 22 to cause body 18 to be established. As shown in FIGS. 5 and 6, body 18 includes a side wall 28 and a floor 30. Floor 30 is appended to a lower portion of side wall 28 and cooperates with side wall 28 to define interior region 14 as shown in FIG. 5. Body 18 may then be accumulated and transported to forming operation 122 where a brim-forming step and a printing step may be performed. During the brim-forming step, brim 16 is formed on body 18 using a brim-forming machine (not shown) where a top portion of body 18 is rolled downwardly toward side wall 28. During the printing step, graphics, words, or other indicia may be printed on outwardly facing surface of outer polymeric layer 12O. Once brim 16 is established on body 18, container 10 is established.

Body 18 is shown, for example, in FIGS. 5 and 6 after cutting operation 120 has been performed on vessel 22. Body 18 includes side wall 28 and floor 30 as shown in FIGS. 5 and 6. An aperture 32 is formed as a result of cutting operation 120. Aperture 32 will become mouth 20 after the brim-forming step has occurred.

Body 218 is formed using container-manufacturing process 300 as shown, for example in FIGS. 7A-8. Container-manufacturing process 300 is, for example, a multi-layer co-extruded blow molding operation as suggested in FIGS. 7A-8. Container-manufacturing operation 300 includes inner layer extrusion operation 102, middle layer extrusion operation 104, outer layer extrusion operation 106, and tube forming operation 108 as shown in FIGS. 3A, 4, 7A, and 8. Inner layer extrusion operation 102 occurs when first extruder 131 extrudes an inner layer 141 which provides inner polymeric layer 12I. Middle layer extrusion operation 104 occurs when second extruder 132 extrudes a middle layer 142 which provides middle insulative cellular non-aromatic polymeric layer 12M. Outer layer extrusion operation 106 occurs when third extruder 133 extrudes an outer layer 143 which provides outer polymeric layer 12O. All three layers 141, 142, 143 are brought together in die 140 during tube forming operation 108 to establish multi-layer tube 12 as shown in FIG. 7A.

Container-manufacturing process 300 further includes extruding multi-layer tube operation 110, mold closing operation 112, air pumping operation 114, mold opening operation 116, and vessel removing operation 118 as shown, for example, in FIGS. 7B-8. During extruding multi-layer tube operation 110, extruders 131, 132, 133 continue to extrude associated layers 141, 142, 143 so that multi-layer tube 12 is extruded between two mold halves 134A, 134B included in mold 134 as shown in FIG. 7A. During mold closing operation 112, mold halves 134A, 134B are brought together to establish mold cavity 134C formed in mold 134. Next, air is pumped into a portion of multi-layer tube 12 trapped in mold cavity 134C to cause multi-layer tube 12 to expand and take on the shape of mold cavity 134C and establish vessel 22 including interior space 24 filled with air. During mold opening operation 116, mold halves 134A, 134B open and move away from one anther as shown in FIG. 7C. Vessel 22 is removed from mold 134.

Container-manufacturing process 300 further includes a cutting operation 320, a floor forming operation 322, a floor coupling operation 324, and a body establishing operation 326 as shown in FIG. 8. During cutting operation 320, a top portion 226 of vessel 22 and a bottom portion 227 of vessel 22 is cut and separated from vessel 22 to cause a side wall 228 to be established as suggested in FIGS. 7C and 7D. During floor forming operation 322, a floor 230 is formed. Floor 230 may be injection molded, thermoformed, or any other suitable alternative. During floor coupling operation 324, floor 230 is coupled to a bottom portion of side wall 228. Body 218 is established during body establishing operation 326 as shown in FIGS. 7D, 9, and 10.

Body 218 includes side wall 228 and floor 230 as shown in FIGS. 9 and 10. Floor 230 is coupled to the lower portion of side wall 228 and cooperates with side wall 228 to define interior region 214 as shown in FIG. 9. In one example, floor 230 is coupled by adhesive to floor 230. In another example, floor 230 is coupled by a heat seal to floor 230. However, any suitable means for coupling floor 230 to side wall 228 may be used.

Body 218 may then be accumulated and transported to forming operation 328 where a brim-forming step and a printing step may be performed. During the brim-forming step, a brim is formed on body 218 using a brim-forming machine (not shown) where a top portion of body 218 is rolled downwardly toward side wall 228. During the printing step, graphics, words, or other indicia may be printed on outwardly facing surface of outer polymeric layer 12O. Once the brim is established on body 218, a container is established.

Another embodiment of a container 410 in accordance with the present disclosure is shown, for example, in FIGS. 11 and 12. Container 410 is made using one of the container-manufacturing processes 100, 300. Container 410 includes a brim 416, a side wall 428, a floor 430 as shown, for example in FIGS. 11 and 12. Container 410 has relatively vertical side wall 428 as compared to container 10 which has an angled side wall 28. In addition, side wall 428 is formed to include a plurality of ribs 434 as shown in FIGS. 11 and 12. Ribs 434 may be used to maximize stack strength of container 410.

Another embodiment of a container 510 in accordance with the present disclosure is shown, for example, in FIGS. 13A and 13E. Container 510 is made from another embodiment of a multi-layer tube that includes an inner polymeric layer 512I, middle insulative cellular non-aromatic polymeric layer 512M, and outer polymeric layer 512O as shown in FIGS. 13C and 13D. Container 510 has, for example, an interior region 514 configured to hold about 750 ml. Container 510 weights about 44 grams.

Inner polymeric layer 512I is made from a polymeric material including high density polyethylene and colorant. Outer polymeric layer 512O is made from a polymeric material including high density polyethylene. Middle insulative cellular non-aromatic polymeric layer 512M is made from an insulative cellular non-aromatic polymeric material that includes high density polyethylene and a talc nucleating agent as suggested in FIG. 13D.

Container 510 includes, from top to bottom, a brim 516 and a body 518 as shown in FIG. 13A. Brim 516 is appended to a top portion of body 518 and arranged to define a mouth 520 opening into interior region 514 formed in body 518. In one example, container 510 is an insulative drink cup and brim 516 is adapted to mate with a lid which covers and closes mouth 520. Body 518 includes a side wall 528 and a floor 530 as shown in FIG. 13B.

In one example, containers 510 were formed from a multi-layer tube. The middle layer used to form middle insulative cellular non-aromatic polymeric material 512M had a density of about 0.83 grams per cubic centimeter. After mating the inner layer with the inner and outer layers and forming container 510, container 510 had a density of about 0.95 grams per cubic centimeter.

In another example, operation of the second extruder 132 was optimized to minimize density of the middle layer. In addition, thicknesses of inner and outer layers were minimized. As a result, inner polymeric layer 512I is about 15% of a total thickness of side wall 528 of container 510. Outer polymeric layer 512O is about 15% of the total thickness of side wall 528 of container 510. Middle insulative cellular non-aromatic polymeric material 512M is about 70% the total thickness of side wall 528 of container 510. Container 510, as a result, has a density of about 0.87 grams per cubic centimeter after optimization.

Inner polymeric layer 512I of container 510 has a weight of about 32 grams. Outer polymeric layer 512O of container 510 has a weight of about 40 grams. Middle insulative cellular non-aromatic polymeric material 512M has a weight of about 35 grams.

The optimized container 510 was tested in an Instron tester to determine top load performance as suggested in FIG. 13E. Table 1 shows the performance of several containers 510 (including middle cellular layer 512M) tested vs. several high density polyethylene containers (excluding middle cellular layer 512M).

TABLE 1

Comparison of Non-Cellular Containers vs. Cellular Containers in top-loading performance (higher collapse force is better and lower mass of container is better)

| Container Type | Mass of Container (grams) | Collapse Force (lbs) |
|---|---|---|
| Non-Cellular | 44.0 | 57 |
| Non-Cellular | 40.0 | 36 |
| Non-Cellular | 35.0 | 26 |
| Cellular | 40.0 | 58 |
| Cellular | 35.0 | 41 |
| Cellular | 32.0 | 32 |

The results of the top-loading testing show that containers 510 withstood higher collapse force even when about 10% lighter than non-cellular containers. As a result, container 510 provides for a more sustainable container as less material is a stronger container is provided that maximizes stack strength.

Another embodiment of a container 610 in accordance with the present disclosure is shown, for example, in FIGS. 14B, 14D, and 14E. Container 610 is made from another embodiment of a multi-layer tube 612 that includes an inner polymeric layer 612I, middle insulative cellular non-aromatic polymeric layer 612M, and outer polymeric layer 612O as shown in FIG. 14C. Container 610 has, for example, an interior region 614.

Container 610 includes, from top to bottom, a neck 616 and a body 618 as shown in FIG. 14B. Neck 616 is appended to a top portion of body 618 and arranged to define a mouth 620 opening into interior region 614 formed in body 618. In one example, container 610 is a shampoo bottle and neck 616 is adapted to mate with a lid which covers and closes mouth 620. Body 618 includes a side wall 628 and a floor 630 as shown in FIG. 14B.

In one example, containers 610 were formed from a multi-layer tube. The middle layer used to form middle insulative cellular non-aromatic polymeric layer 612M had a density of about 0.62 grams per cubic centimeter. After mating the inner layer with the inner and outer layers and forming container 610, container 610 has a density of about 0.88 grams per cubic centimeter as suggested in FIG. 14D. Another embodiment of a container 610A has a density of about 0.81 grams per cubic centimeter as suggested in FIG. 14E.

Container 710 in accordance with the present disclosure is shown in FIG. 15. Container 710 is made from a multi-layer tube including an inner polymeric layer, an outer polymeric layer, and a middle cellular non-aromatic polymeric layer. As shown in FIG. 15, container 710 includes a floor 730, a side wall 728 appended to floor 730 to extend upwardly generally perpendicular to floor 730, and a neck 716 appended to an upper end of side wall 728. Neck 716 defines a mouth 720 arranged to open into an interior region 714 formed between floor 730 and side wall 728.

Container 710 was also subjected to top-load testing as suggested in FIGS. 18 and 20. To begin the top-load testing, an Instron tester is turned on along with a computer coupled to the Instron tester to obtain data and control the tester. Test parameters are then loaded into the computer. The test parameters include a deflection of about 0.200 inches, a speed of about 2 inches per minute, and a minimum load of 45 pounds. After the test parameters are input, a sample container is placed on a platform included in the Instron tester. A test unit included in the Instron tester is then moved to just barely engage the sample container. The test routine is then initiated. As the test unit moves down deforming the sample container, force vs. displacement is measured. Higher forces measured indicate a better performing container.

As shown in FIG. 18 various containers with the same shape but substantially the same mass of about 56 grams were subjected to top-load testing. A control container 800 includes only a solid monolayer of polymeric material having a density of about 0.955 g/cm$^3$. A first sample container 801 includes only a foam monolayer of polymeric material having a density of about 0.51 g/cm$^3$. A second sample container 802 includes only a foam monolayer of polymeric material having a density of about 0.61 g/cm$^3$. A third sample container 803 includes only a foam monolayer of polymeric material having a density of about 0.71 g/cm$^3$. A fourth sample container 804 was made from a multi-layer tube including an inner polymeric layer, an outer polymeric layer, and a middle cellular non-aromatic polymeric layer located therebetween. Fourth sample container 804 had a density of about 0.51 g/cm$^3$. A fifth sample container 805 was made from a multi-layer tube including an inner polymeric layer, an outer polymeric layer, and a middle cellular non-aromatic polymeric layer located therebetween. Fifth sample container 805 had a density of about 0.61 g/cm$^3$. A sixth sample container 806 was made from a multi-layer tube including an inner polymeric layer, an outer polymeric layer, and a middle cellular non-aromatic polymeric layer located therebetween. Sixth sample container 806 had a density of about 0.71 g/cm$^3$. A seventh sample container 807 was made from a multi-layer tube including an inner polymeric layer, an outer polymeric layer, and a middle cellular non-aromatic polymeric layer located therebetween. Seventh sample container 807 had a density of about 0.91 g/cm$^3$.

As shown in FIG. 18, fifth, sixth, and seventh sample containers 805, 806, and 807 all peaked at higher force than control container 800. In addition, sixth sample container 806 had the highest peak force when compared with higher and lower density sample containers 807, 805, 804. The graph shown in FIG. 18 indicates that containers made from the multi-layer tube and having a density less than the density of the control container 800 and higher than about 0.51 g/cm³ have between 5% to about 30% increased compressive strength. In one example, sixth sample 806 container peaked at about 215 pounds while control container 800 peaked at about 170 pounds providing an increase of about 26% in top-load performance. In another example, seventh sample container 807 peaked at about 195 pounds providing an increase of about 15% in top-load performance. In still yet another example, fifth sample container 805 peaked at about 185 pounds providing an increase of about 9% in top-load performance.

As shown in FIG. 20 various containers with the same shape but substantially the same wall thickness of about 0.039 inches were subject to top-load testing. A control container 900 includes only a solid monolayer of polymeric material having a density of about 0.955 g/cm³. A first sample container 901 includes only a foam monolayer of polymeric material having a density of about 0.51 g/cm³. A second sample container 902 includes only a foam monolayer of polymeric material having a density of about 0.61 g/cm³. A third sample container 903 includes only a foam monolayer of polymeric material having a density of about 0.71 g/cm³. A fourth sample container 904 was made from a multi-layer tube including an inner polymeric layer, an outer polymeric layer, and a middle cellular non-aromatic polymeric layer located therebetween. Fourth sample container 904 had a density of about 0.51 g/cm³. A fifth sample container 905 was made from a multi-layer tube including an inner polymeric layer, an outer polymeric layer, and a middle cellular non-aromatic polymeric layer located therebetween. Fifth sample container 905 had a density of about 0.61 g/cm³. A sixth sample container 906 was made from a multi-layer tube including an inner polymeric layer, an outer polymeric layer, and a middle cellular non-aromatic polymeric layer located therebetween. Sixth sample container 906 had a density of about 0.71 g/cm³. A seventh sample container 907 was made from a multi-layer tube including an inner polymeric layer, an outer polymeric layer, and a middle cellular non-aromatic polymeric layer located therebetween. Seventh sample container 907 had a density of about 0.91 g/cm³.

As shown in FIG. 20, fourth fifth, sixth, and seventh sample containers 904, 905, 906, and 907 all had performance between control container 900 and first, second, and third sample containers 901, 902, 903. When wall thickness is maintained and density is varied, higher density containers will be heavier, and thus, provide more material to resist deformation. As a result, the graph of FIG. 20 shows that those container including inner and outer polymeric layers provide substantially increased strength when compared with containers having only the foamed monolayer.

Container 710 was also subjected to side-wall rigidity testing as suggested in FIGS. 19 and 21. To begin the side-wall rigidity testing, a side-wall rigidity tester 750 is turned on as shown in FIGS. 16 and 17. The side-wall rigidity tester 750 includes a Y-bar 752, a T-bar 754, a travel gauge 756, and a force gauge 758 as shown in FIGS. 16 and 17. Y-bar 752 is used to retain a sample container in place during the side-wall rigidity testing. T-bar 754 is coupled to the force gauge 758 and used to deform a side wall of the sample container as force gauge 758 moves toward the sample container. The travel gauge 758 is coupled to the force gauge 758 to move therewith and is configured to measure a distance of displacement that the T-bar 754 deforms the side wall of the container. The force gauge 758 measure force exerted on T-bar 754 by the sample container as the sample container resists movement of the force gauge 758 and T-bar 754 moving toward the sample container.

The sidewall-rigidity testing begins by placing a sample container between T-bar 754 and Y-bar 752. T-bar 754 and gauges 756, 768 are then moved until T-bar 754 contacts the side wall of the sample container. The force gauge 758 and the travel gauge 756 are both zeroed out. Speed of movement of the force gauge 758 and T-bar 754 is set to 100. T-bar 754 and force gauge 758 then engage and deform the side wall of the sample container until the force gauge 758 has moved about 0.25 inches as measured by the travel gauge 756. Force is measured in pounds through movement of the force gauge 758 and the T-bar 754. Higher forces measured indicate a better performing container.

As shown in FIG. 19 various containers with the same shape but substantially the same mass of about 56 grams were subjected to side-wall rigidity testing. Control container 800, monolayer foam containers 801, 802, 803, and multi-layer containers 804, 805, 806, 807 were subjected to side-wall rigidity testing. As shown in FIG. 19, fifth, sixth, and seventh sample containers 805, 806, and 807 all peaked at higher force than control container 800. In addition, sixth sample container 806 had the highest peak force when compared with higher and lower density sample containers 807, 805, 804.

The graph shown in FIG. 19 indicates that containers made from the multi-layer tube and having a density less than the density of the control container 800 and higher than about 0.51 g/cm³ have between 3% to about 30% increased shear strength. In one example, sixth sample 806 container peaked at about 4.7 pounds while control container 800 peaked at about 4.1 pounds providing an increase of about 24% in side-wall rigidity performance. In another example, seventh sample container 807 peaked at about 4.7 pounds providing an increase of about 15% in side-load rigidity performance. In still yet another example, fifth sample container 805 peaked at about 4.2 pounds providing an increase of about 4% in side-wall rigidity performance.

As shown in FIG. 21 various containers with the same shape but substantially the same wall thickness of about 0.039 inches were subject to side-wall rigidity testing. Control container 900, monolayer foam containers 901, 902, 903, and multi-layer containers 904, 905, 906, 907 were subjected to side-wall rigidity testing. As shown in FIG. 21, fourth fifth, sixth, and seventh sample containers 904, 905, 906, and 907 all had performance between control container 900 and first, second, and third sample containers 901, 902, 903. When wall thickness is maintained and density is varied, higher density containers will be heavier, and thus, provide more material to resist deformation. As a result, the graph of FIG. 21 shows that those container including inner and outer polymeric layers provide substantially increased strength when compared with containers having only the foamed monolayer.

A vessel in accordance with present disclosure includes a floor and a sidewall coupled to the floor and arranged to extend upwardly from ground underlying the floor and to cooperate with the floor to define an interior product-storage region therebetween. The floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer. The inner polymeric layer, the outer polymeric layer, and a middle cellular non-aromatic polymeric material cooperate to provide means for maximizing a compressive strength of the vessel as tested by top-load testing and a shear strength of the vessel as tested by side-wall rigidity testing while minimizing a weight of the vessel.

The compressive strength and the shear strength of the vessel may be related to the physical dimensions of the container. The physical dimensions of the container allow for the calculation of a moment area of Inertia for the container as suggested in FIG. 22. The moment of area of inertia of an object about a given axis describes how difficult it is to change an angular momentum of the object about that axis. The moment area of inertia also describes an amount of mass included in in an object and how far each bit of mass is from the axis. The farther the object's mass is from the axis, the more rotational inertia the object has. As a result, more force is required to change the objects rotation rate.

Thus, the compressive strength and the shear strength of the vessel are proportional to the moment area of inertia. The moment area of inertia relative to each axis is defined by the equations below:

$$I_x = \frac{\pi}{4}(r_o^4 - r_i^4)$$
$$I_y = \frac{\pi}{4}(r_o^4 - r_i^4)$$
$$I_z = \frac{\pi}{2}(r_o^4 - r_i^4)$$

The relationship between the moment area of inertia and the vessel and the compressive and shear strengths may be referred to as the I-beam effect.

In an illustrative example, a vessel 1010 was sectioned along the X-Y plane as shown in FIG. 22. Vessel 1010 was formed from a multi-layer tube including an inner polymeric layer 1012I, an outer polymeric layer 1012O, and a middle cellular non-aromatic polymeric layer 1012M as shown in FIG. 22. An outer surface 1014 of outer polymeric layer 1012O provides the value $r_o$ used in the equations above. An inner surface 1016 provided by inner polymeric layer 1012I provides the value $r_i$ used in the equations above.

The following numbered clauses include embodiments that are contemplated and non-limiting:

Clause 1. A vessel comprising a floor and a side wall coupled to the floor and arranged to extend upwardly from ground underlying the floor and to cooperate with the floor to define an interior product-storage region therebetween, wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer, and wherein the middle cellular non-aromatic polymeric material has a density in a range of about 0.01 g/cm³ to about 0.19 g/cm³.

Clause 2. A vessel comprising a floor and a side wall coupled to the floor and arranged to extend upwardly from ground underlying the floor and to cooperate with the floor to define an interior product-storage region therebetween, wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer, and wherein the inner polymeric layer, the outer polymeric layer, and a middle cellular non-aromatic polymeric material cooperate to provide means for maximizing a compressive strength of the vessel as tested by top-load testing and a shear strength of the vessel as tested by side-wall rigidity testing while minimizing a weight of the vessel.

Clause 3. A vessel comprising a floor and a side wall coupled to the floor and arranged to extend upwardly from ground underlying the floor and to cooperate with the floor to define an interior product-storage region therebetween, wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular polymeric material located in the core chamber to lie between the outer polymeric layer and the inner polymeric layer, and wherein the inner polymeric layer, the outer polymeric layer, and a middle cellular non-aromatic polymeric material cooperate to maximize resistance to a collapse force while minimizing a weight of the vessel.

Clause 4. The vessel of any preceding clause, wherein the middle cellular non-aromatic polymeric material comprises polypropylene.

Clause 5. The vessel of any preceding clause, wherein the density of the middle cellular non-aromatic polymeric material is in a range of about 0.1 g/cm³ to about 0.185 g/cm³.

Clause 6. The vessel of any preceding clause, wherein each of the inner polymeric layer, the outer polymeric layer comprise polypropylene.

Clause 7. The vessel of any preceding clause, wherein each of the inner polymeric layer, the outer polymeric layer comprise polypropylene.

Clause 8. The vessel of any preceding clause, wherein the middle cellular non-aromatic polymeric material comprises high-density polyethylene.

Clause 9. The vessel of any preceding clause, wherein the density of the middle cellular non-aromatic polymeric material is in a range of about 0.1 g/cm³ to about 0.185 g/cm³.

Clause 10. The vessel of any preceding clause, wherein each of the inner polymeric layer, the outer polymeric layer comprise polypropylene.

Clause 11. The vessel of any preceding clause, wherein the density of the middle cellular non-aromatic polymeric material is in a range of about 0.1 g/cm³ to about 0.185 g/cm³.

Clause 12. The vessel of any preceding clause, wherein each of the inner polymeric layer, the outer polymeric layer, and the middle cellular non-aromatic polymeric material comprises polypropylene.

Clause 13. The vessel of any preceding clause, further comprising a brim coupled to an upper portion of the side wall and formed to include a mouth opening into the interior product-storage region.

Clause 14. The vessel of any preceding clause, wherein the brim is coupled to each of the inner polymeric layer and the outer polymeric layer to close an annular opening into a portion of the core chamber formed in the side wall.

Clause 15. The vessel of any preceding clause, wherein the middle cellular non-aromatic polymeric material is the only material located in the core chamber.

Clause 16. The vessel of any preceding clause, wherein the middle cellular non-aromatic polymeric material is arranged to fill the core chamber completely.

Clause 17. The vessel of any preceding clause, wherein the middle cellular non-aromatic polymeric material comprises polypropylene.

Clause 18. The vessel of any preceding clause, wherein the density of the middle cellular non-aromatic polymeric material is in a range of about 0.1 g/cm$^3$ to about 0.185 g/cm$^3$.

Clause 19. The vessel of any preceding clause, wherein each of the inner polymeric layer, the outer polymeric layer comprise polypropylene.

Clause 20. The vessel of any preceding clause, wherein the middle cellular non-aromatic polymeric material comprises polypropylene.

Clause 21. The vessel of any preceding clause, wherein the density of the middle cellular non-aromatic polymeric material is in a range of about 0.1 g/cm$^3$ to about 0.185 g/cm$^3$.

Clause 22. The vessel of any preceding clause, wherein the vessel has an average density in a density range of about 0.51 g/cm$^3$ to about 0.91 g/cm$^3$.

Clause 23. The vessel of any preceding clause, wherein the compression strength of the vessel is greater than a compression strength of a control vessel having a mass about the same as a mass of the vessel and a shape about the same as a shape of the vessel.

Clause 24. The vessel of any preceding clause, wherein the compression strength of the vessel is about 5% to about 30% greater than the compression strength of the control vessel.

Clause 25. The vessel of any preceding clause, wherein the shear strength of the vessel is greater than a shear strength of a control vessel having a mass about the same as a mass of the vessel and a shape about the same as a shape of the vessel.

Clause 26. The vessel of any preceding clause, wherein the compression strength of the vessel is about 3% to about 30% greater the compression strength of the control vessel.

Clause 27. The vessel of any preceding clause, wherein the average density is about 0.91 g/cm$^3$.

Clause 28. The vessel of any preceding clause, wherein the compression strength of the vessel is about 9% greater than a compression strength of a control vessel having a mass about the same as a mass of the vessel a shape about the same as a shape of the vessel.

Clause 29. The vessel of any preceding clause, wherein the shear strength of the vessel is about 4% greater than a shear strength of a control vessel having a mass about the same as a mass of the vessel and a shape about the same as a shape of the vessel.

Clause 30. The vessel of any preceding clause, wherein the density range is about 0.6 g/cm$^3$ to about 0.8 g/cm$^3$.

Clause 31. The vessel of any preceding clause, wherein the average density is about 0.61 g/cm$^3$.

Clause 32. The vessel of any preceding clause, wherein the compression strength of the vessel is about 15% greater than a compression strength of a control vessel having a mass about the same as a mass of the vessel a shape about the same as a shape of the vessel.

Clause 33. The vessel of any preceding clause, wherein the shear strength of the vessel is about 15% greater than a shear strength of a control vessel having a mass about the same as a mass of the vessel and a shape about the same as a shape of the vessel.

Clause 34. The vessel of any preceding clause, wherein the average density is about 0.71 g/cm$^3$.

Clause 35. The vessel of any preceding clause, wherein the compression strength of the vessel is about 26% greater than a compression strength of a control vessel having a mass about the same as a mass of the vessel and a shape about the same as a shape of the vessel.

Clause 36. The vessel of any preceding clause, wherein the shear strength of the vessel is about 24% greater than a shear strength of a control vessel having a mass about the same as a mass of the vessel and a shape about the same as a shape of the vessel.

Clause 37. The vessel of any preceding clause, wherein the shear strength of the vessel is about 24% greater than a shear strength of a control vessel having a mass about the same as a mass of the vessel and a shape about the same as a shape of the vessel.

Clause 38. The vessel of any preceding clause, wherein the vessel has a mass of about 56 grams.

Clause 39. The vessel of any preceding clause, wherein the density of the middle cellular polymeric material is in a range of about 0.1 g/cm$^3$ to about 0.185 g/cm$^3$.

Clause 40. The vessel of any preceding clause, wherein the collapse force required to collapse the vessel is greater than a collapse force required to collapse a non-cellular vessel having a shape about the same as a shape of the vessel.

Clause 41. The vessel of any preceding clause, wherein a mass of the vessel is about equal to a mass of the non-cellular vessel.

Clause 42. The vessel of any preceding clause, wherein the collapse force required to collapse the vessel is about 55% to about 65% greater than the collapse force required to collapse the non-cellular vessel.

Clause 43. The vessel of any preceding clause, wherein the collapse force required to collapse the vessel is about 58% greater than the collapse force required to collapse the non-cellular vessel.

Clause 44. The vessel of any preceding clause, wherein the mass is about 35 grams.

Clause 45. The vessel of any preceding clause, wherein the collapse force required to collapse the vessel is about 61% greater than the collapse force required to collapse the non-cellular vessel.

Clause 46. The vessel of any preceding clause, wherein the mass is about 40 grams.

Clause 47. The vessel of any preceding clause, wherein a mass of the vessel is less than a mass of the non-cellular vessel.

Clause 48. The vessel of any preceding clause, wherein the collapse force required to collapse the vessel is about 1% to about 25% greater than a collapse force required to collapse the non-cellular vessel.

Clause 49. The vessel of any preceding clause, wherein a mass of the vessel is about 32 grams and a mass of the non-cellular vessel is about 35 grams.

Clause 50. The vessel of any preceding clause, wherein the collapse force required to collapse the vessel is about 23% greater than the collapse force required to collapse the non-cellular vessel.

Clause 51. The vessel of any preceding clause, wherein a mass of the vessel is about 35 grams and a mass of the non-cellular vessel is about 40 grams.

Clause 52. The vessel of any preceding clause, wherein the collapse force required to collapse the vessel is about 14% greater than the collapse force required to collapse the non-cellular vessel.

Clause 53. The vessel of any preceding clause, wherein a mass of the vessel is about 40 grams and a mass of the non-cellular vessel is about 44 grams.

Clause 54. The vessel of any preceding clause, wherein the collapse force required to collapse the vessel is about 2% greater than the collapse force required to collapse the non-cellular vessel.

Clause 55. The vessel of any preceding clause, wherein a mass of the vessel is about 5% to about 15% smaller than a mass of the non-cellular vessel is about 35 grams.

Clause 56. The vessel of any preceding clause, wherein the collapse force required to collapse the vessel is about 1% to about 25% greater than a collapse force required to collapse the non-cellular vessel.

Clause 57. The vessel of any preceding clause, wherein the middle cellular polymeric material comprises high density polyethylene.

Clause 58. The vessel of any preceding clause, wherein the middle cellular polymeric material is one of linear low density polyethylene, low density polyethylene, an ethylene copolymer, copolymer polypropylene, polypropylene, polystyrene, nylon, polycarbonate, polyester, copolyester, poly phenylene sulfide, poly phenylene oxide, a random copolymer, a block copolymer, an impact copolymer, homopolymer polypropylene, polylactic acid, polyethylene terephthalate, crystallizable polyethylene terephthalate, styrene acrilynitrile, and combinations thereof.

Clause 59. The vessel of any preceding clause, wherein the middle cellular polymeric material is linear low density polyethylene.

Clause 60. The vessel of any preceding clause, wherein the middle cellular polymeric material is low density polyethylene.

Clause 61. The vessel of any preceding clause, wherein the middle cellular polymeric material is an ethylene copolymer.

Clause 62. The vessel of any preceding clause, wherein the ethylene copolymer is TOPAS®.

Clause 63. The vessel of any preceding clause, wherein the middle cellular polymeric material is copolymer polypropylene.

Clause 64. The vessel of any preceding clause, wherein the middle cellular polymeric material is polypropylene.

Clause 65. The vessel of any preceding clause, wherein the middle cellular polymeric material is polystyrene.

Clause 66. The vessel of any preceding clause, wherein the middle cellular polymeric material is nylon.

Clause 67. The vessel of any preceding clause, wherein the nylon is nylon 6/6.

Clause 68. The vessel of any preceding clause, wherein the nylon is nylon 6.

Clause 69. The vessel of any preceding clause, wherein the middle cellular polymeric material is polycarbonate.

Clause 70. The vessel of any preceding clause, wherein the middle cellular polymeric material is polyester.

Clause 71. The vessel of any preceding clause, wherein the middle cellular polymeric material is copolyester.

Clause 72. The vessel of any preceding clause, wherein the middle cellular polymeric material is poly phenylene sulfide.

Clause 73. The vessel of any preceding clause, wherein the middle cellular polymeric material is poly phenylene oxide.

Clause 74. The vessel of any preceding clause, wherein the middle cellular polymeric material is a random copolymer.

Clause 75. The vessel of any preceding clause, wherein the middle cellular polymeric material is a block copolymer.

Clause 76. The vessel of any preceding clause, wherein the middle cellular polymeric material is an impact copolymer.

Clause 77. The vessel of any preceding clause, wherein the middle cellular polymeric material is homopolymer polypropylene.

Clause 78. The vessel of any preceding clause, wherein the middle cellular polymeric material is polylactic acid.

Clause 79. The vessel of any preceding clause, wherein the middle cellular polymeric material is polyethylene terephthalate.

Clause 80. The vessel of any preceding clause, wherein the polyethylene terephthalate is crystallizable polyethylene terephthalate.

Clause 81. The vessel of any preceding clause, wherein the middle cellular polymeric material is and styrene acrilynitrile.

Clause 82. The vessel of any preceding clause, wherein the middle cellular polymeric material is poly methyl methacrylate.

Clause 83. The vessel of any preceding clause, wherein the middle cellular polymeric material is polyvinyl chloride.

Clause 84. The vessel of any preceding clause, wherein the middle cellular polymeric material is acrylonitrile butadiene styrene.

Clause 85. The vessel of any preceding clause, wherein the middle cellular polymeric material is polyacrylonitrile.

Clause 86. The vessel of any preceding clause, wherein the middle cellular polymeric material is polyamide.

The invention claimed is:

1. A vessel comprising
a floor and
a seamless side wall coupled to the floor and arranged to extend upwardly from ground underlying the floor and to cooperate with the floor to define an interior product-storage region therebetween,
wherein the floor and the seamless side wall cooperate to form a monolithic element comprising an inner polymeric layer, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer so as to contact the inner polymeric layer and the outer polymeric layer.

2. The vessel of claim 1, wherein the middle cellular polymeric material is one of linear low density polyethylene, low density polyethylene, an ethylene copolymer, copolymer polypropylene, polypropylene, polystyrene, nylon, polycarbonate, polyester, copolyester, poly phenylene sulfide, poly phenylene oxide, a random copolymer, a block copolymer, an impact copolymer, homopolymer polypropylene, polylactic acid, polyethylene terephthalate, crystallizable polyethylene terephthalate, styrene acrilynitrile, poly methyl methacrylate, polyvinyl chloride, acrylonitrile butadiene styrene, polyacrylonitrile, polyamide, and combinations thereof.

3. The vessel of claim 1, wherein the middle cellular polymeric material comprises polylactic acid.

4. The vessel of claim 1, wherein the middle cellular non-aromatic polymeric material comprises high-density polyethylene.

5. The vessel of claim 4, wherein the density of the middle cellular non-aromatic polymeric material is in a range of about 0.1 g/cm$^3$ to about 0.185 g/cm$^3$.

6. The vessel of claim 5, wherein the vessel has an average density in a density range of about 0.5 g/cm$^3$ to about 0.9 g/cm$^3$.

7. The vessel of claim 6, wherein the density range is about 0.6 g/cm$^3$ to about 0.8 g/cm$^3$.

8. The vessel of claim 6, wherein each of the inner polymeric layer, the outer polymeric layer comprise high-density polyethylene.

9. The vessel of claim 1, wherein the middle cellular non-aromatic polymeric material comprises polypropylene.

10. The vessel of claim 9, wherein the density of the middle cellular non-aromatic polymeric material is in a range of about 0.1 g/cm$^3$ to about 0.19 g/cm$^3$.

11. The vessel of claim 1, further comprising a brim coupled to an upper portion of the side wall and formed to include a mouth opening into the interior product-storage region.

12. The vessel of claim 11, wherein the brim is coupled to each of the inner polymeric layer and the outer polymeric layer to close an annular opening into a portion of the core chamber formed in the side wall.

13. The vessel of claim 1, wherein the middle cellular non-aromatic polymeric material comprises polyethylene.

14. The vessel of claim 13, wherein the vessel has an average density in a density range of about 0.5 g/cm$^3$ to about 0.9 g/cm$^3$.

15. The vessel of claim 14, wherein each of the inner polymeric layer, the outer polymeric layer comprises polyethylene.

16. The vessel of claim 15, wherein the middle cellular non-aromatic polymeric material comprises low density polyethylene.

17. The vessel of claim 15, wherein each of the inner polymeric layer, the outer polymeric layer comprises low density polyethylene.

18. The vessel of claim 1, wherein the outer polymeric layer is made from a material and the middle cellular polymeric material is made from a different material.

19. The vessel of claim 18, where the inner polymeric layer is made from the material of the outer polymeric material.

20. The vessel of claim 19, wherein the vessel has an average density in a density range of about 0.5 g/cm$^3$ to about 0.9 g/cm$^3$.

21. The vessel of claim 18, where the inner polymeric layer is made from a material different from the material of the outer polymeric layer.

\* \* \* \* \*